US012689103B2

(12) United States Patent
Tian et al.

(10) Patent No.: US 12,689,103 B2
(45) Date of Patent: Jul. 21, 2026

(54) BATTERY CELL, BATTERY, AND ELECTRIC DEVICE

(71) Applicant: CONTEMPORARY AMPEREX TECHNOLOGY CO., LIMITED, Ningde (CN)

(72) Inventors: Yaxi Tian, Ningde (CN); Daichun Tang, Ningde (CN); Honggang Yu, Ningde (CN); Haizu Jin, Ningde (CN); Rui Yang, Ningde (CN); Xichen Wei, Ningde (CN); Zhiyao Li, Ningde (CN); Yuanda Yao, Ningde (CN)

(73) Assignee: CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 0 days.

(21) Appl. No.: 19/300,335

(22) Filed: Aug. 14, 2025

(65) Prior Publication Data

US 2025/0372845 A1 Dec. 4, 2025

Related U.S. Application Data

(63) Continuation of application No. PCT/CN2024/073714, filed on Jan. 23, 2024.

(30) Foreign Application Priority Data

Aug. 11, 2023 (CN) .......................... 202311017397.0

(51) Int. Cl.
*H01M 50/586* (2021.01)
*H01M 50/533* (2021.01)
(Continued)

(52) U.S. Cl.
CPC ....... *H01M 50/586* (2021.01); *H01M 50/533* (2021.01); *H01M 50/536* (2021.01);
(Continued)

(58) Field of Classification Search
CPC ............. H01M 50/586; H01M 50/533; H01M 50/536; H01M 50/538; H01M 50/54; H01M 50/627; H01M 2220/20
See application file for complete search history.

(56) References Cited

U.S. PATENT DOCUMENTS

2016/0336581 A1 * 11/2016 Kwak ................... H01M 50/55

FOREIGN PATENT DOCUMENTS

CN 215988974 U * 3/2022
CN 216054941 U 3/2022
(Continued)

OTHER PUBLICATIONS

English translation of CN215988974U (Year: 2022).*
(Continued)

*Primary Examiner* — Ula C Ruddock
*Assistant Examiner* — Sarika Gupta
(74) *Attorney, Agent, or Firm* — Ladas & Parry, LLP

(57) ABSTRACT

This disclosure pertains to the technical fields of batteries, and provides a battery cell, a battery, and an electric device. The electric device includes a battery, the battery includes a battery cell, and the battery cell includes a casing, an electrode assembly, an electrode terminal, an adapter, and an insulating member. The electrode assembly is disposed within the casing. The adapter is disposed within the casing and conductively connected to the electrode assembly and the electrode terminal. The insulating member is disposed within the casing and at least partially located between the adapter and the casing, and at least a portion of the insulating member is spaced apart from the adapter. Spacing at least the portion of the insulating member apart from the adapter can mitigate the problem that heat from the adapter being conducted to the insulating member causes failure of insulation performance of the insulating member.

18 Claims, 6 Drawing Sheets

(51) Int. Cl.
    *H01M 50/536*     (2021.01)
    *H01M 50/538*     (2021.01)
    *H01M 50/54*     (2021.01)
    *H01M 50/627*     (2021.01)

(52) U.S. Cl.
    CPC ......... *H01M 50/538* (2021.01); *H01M 50/54*
        (2021.01); *H01M 50/627* (2021.01); *H01M*
        *2220/20* (2013.01)

(56)         References Cited

FOREIGN PATENT DOCUMENTS

| | | | | |
|---|---|---|---|---|
| CN | 216120664 | U | * | 3/2022 |
| CN | 217544754 | U | | 10/2022 |
| CN | 217719893 | U | | 11/2022 |
| CN | 218602480 | U | | 3/2023 |
| JP | 2013093287 | A | | 5/2013 |

OTHER PUBLICATIONS

English translation of CN216120664U (Year: 2022).*
International Search Report dated Apr. 3, 2024 for application PCT/CN2024/073714.
Written Opinion dated Apr. 3, 2024 for application PCT/CN2024/073714.
Chinese Office Action dated Nov. 13, 2024 for application CN 202490000005.1.

* cited by examiner

BATTERY CELL, BATTERY, AND ELECTRIC DEVICE

CROSS-REFERENCE TO RELATED APPLICATIONS

This application is a continuation of International application PCT/CN2024/073714 filed Jan. 23, 2024 that claims priority to Chinese Patent Application No. 202311017397.0, filed on Aug. 11, 2023. The content of these applications is incorporated herein by reference in its entirety.

TECHNICAL FIELD

This application relates to the technical field of batteries, and specifically to a battery cell, a battery, and an electric device.

BACKGROUND

In related art, a battery cell includes a casing, an electrode assembly, an electrode terminal, an adapter, and an insulating member. The electrode assembly, adapter, and insulating member are all disposed within the casing, and the electrode terminal is disposed on the casing. The adapter is welded to both a tab of the electrode assembly and the electrode terminal, to establish an electrical conduction between the electrode assembly and the electrode terminal. The insulating member is configured to implement insulation between the adapter and the casing and between the electrode assembly and the casing.

In certain scenarios, heat is generated when current flows through the adapter, when the adapter is welded to the tab, or when the adapter is welded to the electrode terminal. This heat is conducted to the insulating member, posing a risk that the insulating member being melted causes failure of insulation performance of the insulating member.

SUMMARY

In view of the above problems, an objective of embodiments of this application is to provide a battery cell, a battery, and an electric device capable of mitigating the technical problem that the insulating member being melted causes failure of insulation performance.

Technical solutions adopted by the embodiments of this application are as follows:

According to a first aspect, the embodiments of this application provide a battery cell, including:

a casing;

an electrode assembly disposed within the casing;

an electrode terminal disposed on the casing;

an adapter disposed within the casing and conductively connected to the electrode assembly and the electrode terminal; and an insulating member disposed within the casing and at least partially located between the casing and the adapter, where at least a portion of the insulating member is spaced apart from the adapter.

In the battery cell provided by the embodiments of this application, spacing at least the portion of the insulating member apart from the adapter can reduce heat conduction between the adapter and the insulating member, and therefore can mitigate the problem that heat from the adapter being conducted to the insulating member causes failure of insulation performance of the insulating member. This allows the insulating member to achieve good insulation effects between the adapter and the casing.

In some embodiments, the adapter is disposed at an end of the electrode assembly along a first direction, the insulating member includes a body portion, and along the first direction, the body portion is located between the adapter and the casing and is spaced apart from the adapter along the first direction.

This arrangement enables the insulating member to implement insulation between the casing and the adapter, and the body portion of the insulating member to be spaced apart from the adapter, so as to reduce heat conduction between the adapter and the body portion, thereby mitigating the problem of insulation performance failure of the body portion.

In some embodiments, the insulating member further includes a first boss, the first boss being disposed on a side of the body portion facing towards the electrode assembly along the first direction; and the adapter is spaced apart from the first boss along a second direction, the second direction intersecting the first direction.

With the foregoing technical solution, the adapter is spaced apart not only from the body portion of the insulating member but also from the first boss of the insulating member. This can desirably reduce heat conduction between the adapter and the insulating member, thereby mitigating the problem that heat from the adapter causes insulation performance failure of the insulating member, specifically including insulation performance failure of the body portion of the insulating member and insulation performance failure of the first boss.

In some embodiments, a wall of the casing along the first direction is provided with an electrolyte injection hole, the insulating member further includes a protruding post, the protruding post is disposed on a side of the body portion facing towards the electrode assembly along the first direction, the protruding post is in communication with the electrolyte injection hole and with an interior of the casing, and the adapter is spaced apart from the protruding post along a second direction, the second direction intersecting the first direction.

With the foregoing technical solution, the adapter is spaced apart not only from the body portion of the insulating member but also from the protruding post of the insulating member. This can desirably reduce heat conduction between the adapter and the insulating member, thereby mitigating the problem that heat from the adapter causes insulation performance failure of the insulating member.

In some embodiments, a gap formed by the spacing between at least a portion of the insulating member and the adapter is greater than 0.1 mm.

This arrangement ensures a relatively large gap between at least the portion of the insulating member and the adapter, thereby reducing heat conduction between the adapter and the insulating member, and facilitating mitigation of the problem that heat from the adapter causes insulation performance failure of the insulating member. In some embodiments, the gap formed by the spacing between at least the portion of the insulating member and the adapter is less than 2 mm.

This, in addition to mitigating the problem that heat from the adapter causes insulation performance failure of the insulating member, can enhance the compactness of the arrangement of the adapter and the insulating member, thereby helping to achieve structural compactness of the battery cell and improving the energy density of the battery cell.

In some embodiments, the electrode assembly is welded to the adapter.

Welding the electrode assembly to the adapter can establish a conductive connection between the electrode assembly and the adapter, facilitating electrical conduction between the electrode assembly and the electrode terminal.

In some embodiments, a portion of the adapter configured to be welded to the electrode assembly is spaced apart from the insulating member.

Spacing the portion of the adapter configured to be welded to the electrode assembly from the insulating member can reduce the speed of conducting heat generated from the welding process of the electrode assembly and the adapter to the insulating member, thereby mitigating the problem of insulation performance failure of the insulating member.

In some embodiments, the adapter is provided with a positioning hole, and the electrode terminal is inserted into the positioning hole.

Inserting the electrode terminal into the positioning hole facilitates positioning of the electrode terminal on the battery cell and facilitates conductive connection between the electrode terminal and the adapter.

In some embodiments, the electrode assembly is welded to the adapter, and a weld mark formed by welding the electrode assembly to the adapter is spaced apart from the positioning hole.

This arrangement can mitigate the problem that welding material used in the welding process of the tab and the adapter flows into the positioning hole, thereby mitigating interference of the welding technology of the tab and the adapter with the function of the positioning hole in positioning the electrode terminal, and facilitating assembly of the battery cell.

In some embodiments, the electrode assembly includes a main body portion and a tab disposed on the main body portion, the tab includes a plurality of sub-tabs, the plurality of sub-tabs are welded to form a first weld mark, at least a portion of the first weld mark is welded to the adapter to form a second weld mark, and the second weld mark is spaced apart from the positioning hole.

This can mitigate the problem that welding material used in the welding process of the tab and the adapter flows into the positioning hole, thereby reducing interference of the welding technology of the tab and the adapter with the function of the positioning hole in positioning the electrode terminal, and facilitating assembly of the battery cell. Additionally, welding the plurality of sub-tabs of the tab to form the first weld mark facilitates the welding operation between the tab and the adapter.

In some embodiments, the plurality of sub-tabs are welded and welded to the adapter to form the first weld mark, the first weld mark being spaced apart from the positioning hole.

This arrangement allows the plurality of sub-tabs to be welded to the adapter during the welding process, increasing the number of welding operations between the tab and the adapter, thereby enhancing the conductive strength between the adapter and the tab. Additionally, the first weld mark is also spaced apart from the positioning hole, so that welding material is not prone to flow into the positioning hole during the welding process of the sub-tabs and the adapter, reducing interference of the welding technology of the tab and the adapter with the function of the positioning hole in positioning the electrode terminal, and facilitating assembly of the battery cell.

In some embodiments, a minimum spacing between the weld mark formed by welding the electrode assembly to the adapter and the positioning hole ranges from 0.2 mm to 6 mm.

This configuration provides an appropriate range for the minimum spacing between the weld mark formed by welding the electrode assembly to the adapter and the positioning hole. This can first mitigate the problem that welding material flows into the positioning hole during the welding process of the electrode assembly and the adapter, thereby reducing interference of the welding technology of the electrode assembly and the adapter with the function of the positioning hole in positioning the electrode terminal. Second, this allows the weld mark formed by welding the electrode assembly to the adapter and the positioning hole to be compactly arranged on the adapter, thereby reducing the size of the adapter.

In some embodiments, the electrode assembly includes a main body portion and a tab disposed on the main body portion, the tab includes a first tab, the electrode terminal includes a first electrode terminal, the adapter includes a first adapter, the insulating member includes a first insulating member, the first adapter is conductively connected to the first tab and the first electrode terminal, at least a portion of the first insulating member is located between the first adapter and the casing, and at least a portion of the first insulating member is spaced apart from the first adapter;

where the first adapter is conductively connected to the first tab to form a plurality of spaced-apart first connection portions.

This first ensures more uniform current distribution between the first adapter and the first tab, reducing the current flow temperature of the first adapter to mitigate the problem that current concentration in the first adapter causes heat concentration, thereby mitigating the problem that excessively much heat of the first adapter causes insulation performance failure of the insulating member. Second, this can allow for a good current capacity between the first adapter and the first tab.

In some embodiments, the casing is provided with an electrolyte injection hole, and the plurality of first connection portions are disposed on a side of the first electrode terminal farther away from the electrolyte injection hole.

Positioning the first connection portions on the side of the first electrode terminal farther away from the electrolyte injection hole enables the first adapter to be away from the electrolyte injection hole as far as possible. This can ensure that the first adapter does not interfere with the operation of the electrolyte injection hole.

In some embodiments, a first wall is provided on a side of the casing along a first direction, and the first electrode terminal and the electrolyte injection hole are spaced apart on the first wall.

Positioning the first electrode terminal and the electrolyte injection hole on the same wall of the casing along the first direction helps to enhance the structural compactness of the battery cell.

In some embodiments, the first tab includes a plurality of first sub-tabs, the plurality of first sub-tabs being connected to form a second connection portion, and at least a portion of the second connection portion being conductively connected to the first adapter to form the first connection portion.

This configuration can allow for desirable conductive connection between the first tab and the first adapter.

In some embodiments, the tab further includes a second tab, the electrode terminal further includes a second electrode terminal, the adapter further includes a second adapter, the insulating member further includes a second insulating member, the second adapter is conductively connected to the second tab and the second electrode terminal, at least a portion of the second insulating member is located between the second adapter and the casing, and at least a portion of the second insulating member is spaced apart from the second adapter.

This configuration ensures that the insulating member can be disposed between each adapter and the casing, thereby implementing insulation between each adapter and the casing.

In some embodiments, the tab further includes a second tab, the electrode terminal further includes a second electrode terminal, the adapter further includes a second adapter, the second adapter is conductively connected to the second tab and the second electrode terminal, and the second tab is conductively connected to the second adapter to form a plurality of spaced-apart third connection portions.

This first ensures more uniform current distribution between the second adapter and the second tab, reducing the current flow temperature of the second adapter to mitigate the problem that current concentration in the second adapter causes heat concentration, thereby mitigating the problem that excessively much heat of the second adapter causes insulation performance failure of the insulating member. Second, this can allow for a good current capacity between the second adapter and the second tab.

In some embodiments, at least a portion of the second electrode terminal is located between two third connection portions.

This configuration disperses positions of the second adapter for connection to the second tab, ensuring more uniform current distribution within the battery cell, thereby reducing the current flow temperature of the second adapter, and lowering the risk of insulation performance failure of the insulating member caused by the second adapter.

In some embodiments, the second tab includes a plurality of second sub-tabs, the plurality of second sub-tabs being connected to form a fourth connection portion, and at least a portion of the fourth connection portion being conductively connected to the second adapter to form the third connection portion.

This configuration can allow for desirable conductive connection between the second tab and the second adapter.

In some embodiments, the plurality of second sub-tabs are connected to form a plurality of spaced-apart fourth connection portions, at least a portion of each fourth connection portion being conductively connected to the second adapter to form a corresponding third connection portion.

With the plurality of spaced-apart fourth connection portions formed by connecting the second sub-tabs so that each fourth connection portion is conductively connected to the second adapter to form the corresponding third connection portion, current distribution between the second adapter and the second tab can be more uniform, thereby reducing the current flow temperature of the second adapter and lowering the risk of insulation performance failure of the insulating member caused by the second adapter.

According to a second aspect, the embodiments of this application provide a battery including the battery cell.

According to the battery provided by the embodiments of this application, the foregoing battery cell is used, and at least a portion of an insulating member is spaced apart from an adapter, so that heat conduction between the adapter and the insulating member can be reduced, thereby mitigating the problem that heat from the adapter being conducted to the insulating member causes failure of insulation performance of the insulating member. Therefore, this enables the insulating member to achieve good insulation effects between the adapter and the casing, thereby enhancing the reliability of the battery.

According to a third aspect, the embodiments of this application provide an electric device including the battery cell or the battery.

According to the electric device provided by the embodiments of this application, the foregoing battery cell or battery is used, and at least a portion of an insulating member is spaced apart from an adapter, so that heat conduction between the adapter and the insulating member can be reduced, thereby mitigating the problem that heat from the adapter being conducted to the insulating member causes failure of insulation performance of the insulating member. Therefore, this enables the insulating member to achieve good insulation effects between the adapter and the casing, thereby enhancing the reliability of the battery cell or battery.

The above description is merely an overview of the technical solutions of this application. To facilitate a clearer understanding of the technical means of this application, the content of the specification can be implemented, and to make the above and other objects, features, and advantages of this application more apparent, specific embodiments of this application are provided below.

BRIEF DESCRIPTION OF DRAWINGS

To more clearly illustrate the technical solutions in the embodiments of this application, the drawings required for the description of the embodiments or exemplary technical descriptions are briefly introduced below. It is apparent that the drawings described below are merely some embodiments of this application, and those of ordinary skill in the art can obtain other drawings based on these drawings without creative effort.

REFERENCE SIGNS IN THE DRAWINGS

Figure 1:
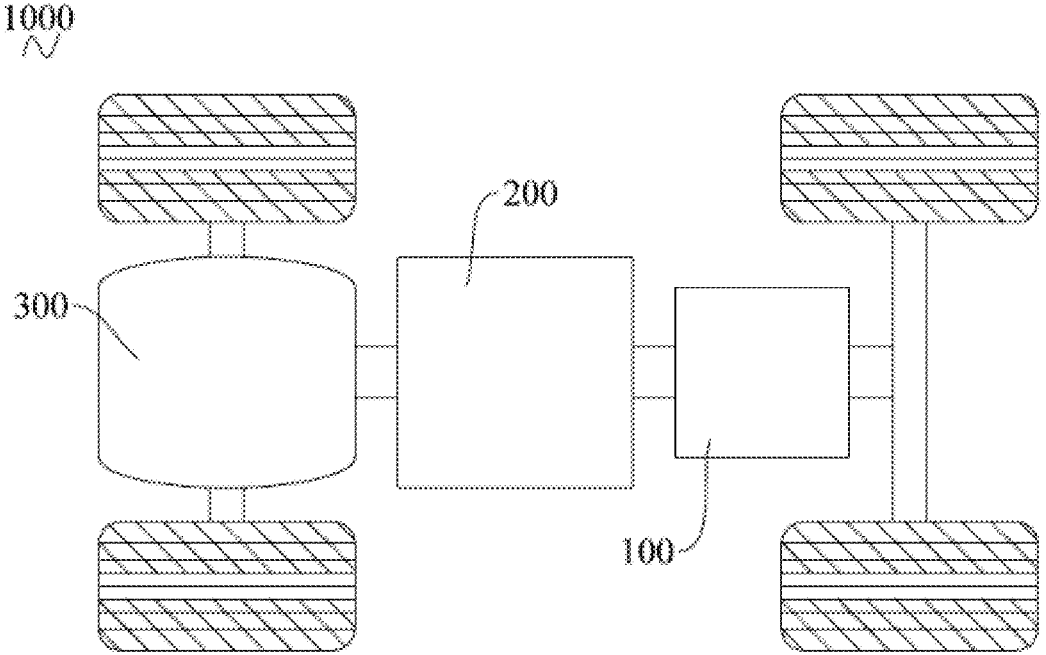
FIG. 1 is a schematic diagram of a vehicle according to some embodiments of this application.

1000—vehicle; 100—battery; 200—controller; 300—motor; 10—battery cell; 20—box; 21—first portion; 22—second portion; 11—electrode assembly; 111—main body portion; 112—tab; 112*a*—first tab; 1121*a*—first connection portion; 1122*a*—second connection portion; 112*b*—second tab; 1121*b*—third connection portion; 1122*b*—fourth connection portion; 12—casing; 1201—electrolyte injection hole; 121—casing body; 122—end cap; 122*a*—first wall; 122*b*—second wall; 13—electrode terminal; 13*a*—first electrode terminal; 13*b*—second electrode terminal; 14—adapter; 1401—positioning hole; 14*a*—first adapter; 14*b*—second adapter; 15—insulating member; 1501—through hole; 15*a*—first insulating member; 15*b*—second insulating member; 151—body portion; 152—first boss; 153—protruding post; 154—second boss; H1—first gap; H2—second gap; H3—third gap; H4—first spacing; H5—second spacing; Z—first direction; X—second direction; and Y—third direction.

DETAILED DESCRIPTION

Embodiments of this application are described in detail below, examples of which are illustrated in the accompanying drawings, where the same or similar reference numerals denote the same or similar elements or elements having the same or similar functions throughout. The embodiments described below with reference to the drawings are illustrative and intended to explain this application, and should not be construed as limiting this application.

In the description of this application, it is to be understood that terms such as "length," "width," "upper," "lower," "front," "rear," "left," "right," "perpendicular," "horizontal," "top," "bottom," "inside," "outside," and the like indicate orientations or positional relationships based on those shown in the drawings. These terms are used for convenience and brevity in describing this application and do not indicate or imply that the devices or elements mentioned must have a specific orientation or be constructed or operated in a specific orientation, and thus should not be construed as limiting this application.

Furthermore, the terms "first" and "second" are used for descriptive purposes only and are not to be construed as indicating or implying relative importance or implicitly indicating the number of technical features indicated. Thus, a feature defined by "first" or "second" may explicitly or implicitly include one or more such features.

In the description of this application, "a plurality of" means more than two, unless otherwise specifically defined, and "more than two" includes two. Correspondingly, "a plurality of groups" means more than two groups, including two groups.

In the description of this application, unless otherwise expressly specified and defined, terms such as "mounting," "connection," "join," and "fastening" should be understood in a broad sense. For example, they may refer to a fixed connection, a detachable connection, or an integral connection; a mechanical connection or an electrical connection; or a direct connection, an indirect connection via an intermediate medium, an internal communication between two elements, or an interaction between two elements. Persons of ordinary skill in the art can understand the specific meanings of these terms in this application based on specific contexts.

In the description of this application, the term "and/or" is merely an associative relationship describing associated objects, indicating that three relationships may exist. For example, A and/or B may indicate: A exists alone, A and B exist together, or B exists alone. Additionally, in this application, the character "/" generally indicates an "or" relationship between the associated objects.

Although this application has been described with reference to preferred embodiments, various improvements can be made, and components therein can be replaced with equivalents without departing from the scope of this application. In particular, as long as there is no structural conflict, the technical features mentioned in the various embodiments can be combined in any manner. This application is not limited to the specific embodiments disclosed herein but includes all technical solutions falling within the scope of the claims.

In related art, a battery cell typically includes a casing, an electrode assembly, an electrode terminal, and an adapter. The electrode assembly and the adapter are both disposed within an internal environment defined by the casing, and the electrode terminal is disposed on the casing. The adapter is welded to both a tab of the electrode assembly and the electrode terminal, to establish an electrical conduction between the electrode assembly and the electrode terminal. This allows the adapter to implement current flow between the electrode assembly and the electrode terminal.

Additionally, the battery cell further includes an insulating member disposed within the casing. The insulating member can be configured to at least implement insulation between the adapter and the casing and between the electrode assembly and the casing.

In some cases, heat is generated when current flows through the adapter, and the heat generated when current flows through the adapter is conducted to the insulating member. Over prolonged use of the battery cell, there is a risk that the insulating member being melted causes failure of insulation performance of the insulating member. Particularly, when a short circuit occurs in the battery cell, the current within the adapter increases sharply, and energy is released rapidly, causing a significant temperature rise in the adapter. This makes it highly likely for heat to be conducted to the insulating member, resulting in insulation performance failure of the insulating member and causing a short circuit within the battery cell.

In some cases, welding operations, such as welding the adapter to the tab or the adapter to the electrode terminal, also generate significant heat. This heat is conducted to the insulating member, posing a risk that the insulating member being melted causes failure of insulation performance of the insulating member, which leads to a short circuit within the battery cell.

Thus, heat from the adapter is conducted to the insulating member, creating a risk of the insulating member being melted by the adapter, which leads to insulation performance failure.

Based on the above considerations, the embodiments of this application provide a battery cell, a battery, and an electric device. Spacing at least a portion of an insulating member apart from an adapter can reduce heat conduction between the adapter and the insulating member, and therefore can mitigate the problem that heat from the adapter being conducted to the insulating member causes failure of insulation performance of the insulating member. This enables the insulating member to achieve good insulation effects between the adapter and a casing.

In some embodiments, the battery cell of the embodiments of this application can be used in an electric device that uses a battery cell or a battery as a power source, and the battery of the embodiments of this application can be used in an electric device that uses a battery as a power source.

The electric device may include, but is not limited to, a mobile phone, a tablet, a laptop, an electric toy, an electric tool, an electric bicycle, an electric vehicle, a ship, a spacecraft, and the like. The electric toy may be a fixed or mobile electric toy, such as a game console, an electric toy car, an electric toy ship, or an electric toy airplane. The spacecraft may include an airplane, a rocket, a space shuttle, a spaceship, and the like. The vehicle may be a fuel vehicle, a gas vehicle, or a new energy vehicle, and the new energy vehicle may be a pure electric vehicle, a hybrid vehicle, or an extended-range vehicle.

In some embodiments, the battery cell and battery of the embodiments of this application can alternatively be used in an energy storage device. The energy storage device may be an energy storage container, an energy storage cabinet, or the like.

The battery according to the embodiments of this application may be a single physical module that includes one or more battery cells to provide higher voltage and capacity. When a plurality of battery cells are provided, the plurality of battery cells are connected in series, parallel, or series-parallel via a busbar, where "series-parallel" refers to a combination of series and parallel connections of the plurality of battery cells.

In some embodiments, the battery may be a battery module. When a plurality of battery cells are provided, the plurality of battery cells are arranged and fixed to form a battery module. For example, the plurality of battery cells may be fixed using a strap or the like to form a battery module. For example, the plurality of battery cells may alternatively be fixed using an end plate, a side plate, or the like to form a battery module.

In some embodiments, the battery may be a battery pack, and the battery pack may include a box and a battery cell. For example, the battery cell may be directly accommodated in the box. For example, the battery cell may alternatively first form a battery module and then be accommodated in the box.

For ease of description, the embodiments of this application take an electric device being a vehicle as an example for description.

Referring to FIG. 1, FIG. 1 is a schematic diagram of a vehicle 1000 according to some embodiments of this application. The vehicle 1000 is internally provided with the foregoing battery 100. The battery 100 may be disposed at the bottom, head, or tail of the vehicle 1000. The battery 100 may be used to supply power to the vehicle 1000. For example, the battery 100 may be used as an operational power source of the vehicle 1000. The vehicle 1000 may further include a controller 200 and a motor 300, the controller 200 being configured to control the battery 100 to supply power to the motor 300, for example, to meet the power requirements for starting, navigating, and driving the vehicle 1000.

In some embodiments, the battery 100 may serve not only as an operational power source of the vehicle 1000 but also as a driving power source of the vehicle 1000, replacing or partially replacing fuel or natural gas to provide driving power for the vehicle 1000.

Figure 2:
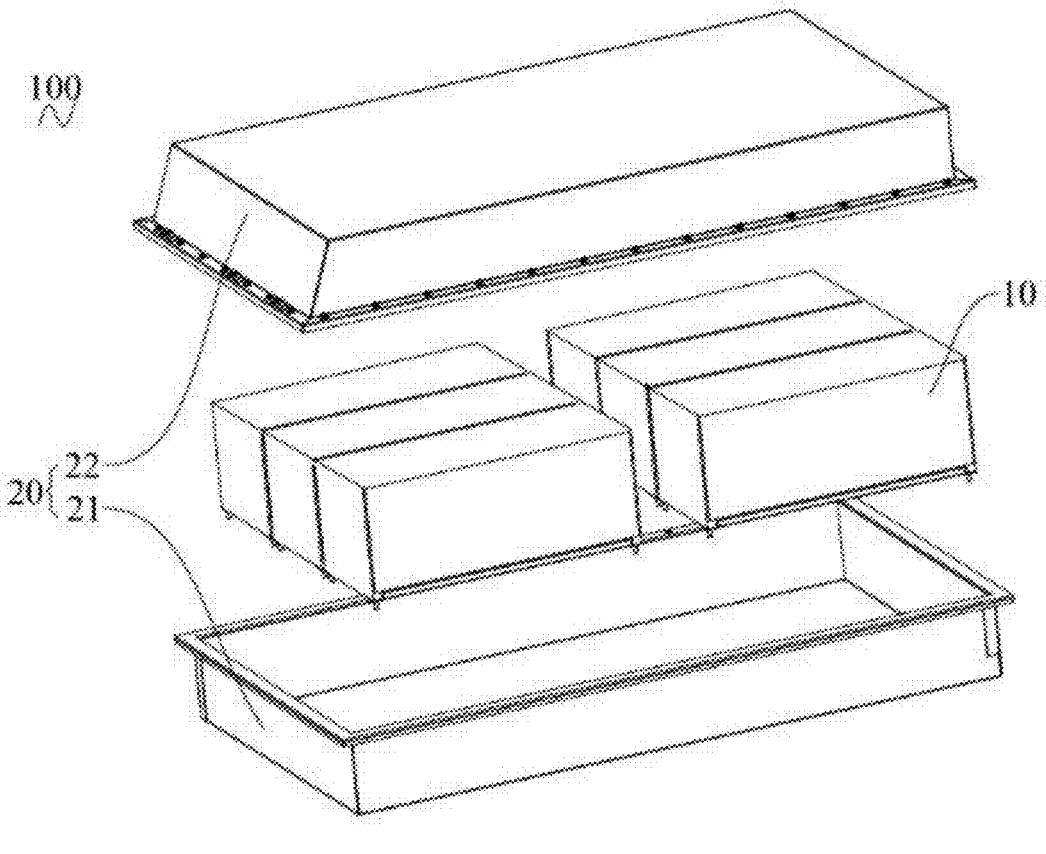
FIG. 2 is an exploded schematic view of a battery according to some embodiments of this application.

Referring to FIG. 2, FIG. 2 is an exploded view of a battery 100 according to some embodiments of this application. The battery 100 includes a box 20 and a plurality of battery cells 10. The box 20 is a structure with an accommodating space inside, and the box 20 may adopt various structures. In some embodiments, the box 20 may include a first portion 21 and a second portion 22, the first portion 21 and the second portion 22 being mutually fitted to collectively define the accommodating space. The first portion 21 may be a hollow structure with an opening at one end, and the second portion 22 may be a plate-like structure, the second portion 22 covering the opening side of the first portion 21, so that the first portion 21 and the second portion 22 collectively define the accommodating space. Alternatively, as shown in FIG. 2, both the first portion 21 and the second portion 22 may be hollow structures with an opening at one end, the opening side of the first portion 21 fitting the opening side of the second portion 22, so that the first portion 21 and the second portion 22 collectively define the accommodating space. The box 20 composed of the first portion 21 and the second portion 22 may have various shapes, such as a cylinder or a cuboid.

In some embodiments, a plurality of battery cells 10 may be connected in series, parallel, or series-parallel to form an integral unit. Then the integral unit formed by the plurality of battery cells 10 is directly accommodated in the accommodating space of the box 20, as shown in FIG. 2. Alternatively, a plurality of battery cells 10 may first be connected in series, parallel, or series-parallel and arranged and fixed to form a plurality of battery modules, and the plurality of battery modules may then be connected in series, parallel, or series-parallel to form an integral unit, which is accommodated in the accommodating space of the box 20.

In some embodiments, referring to FIG. 1 and FIG. 2, when the battery 100 is applied to the vehicle 1000, the box 20 of the battery 100 may form a part of the chassis structure of the vehicle 1000. For example, a portion of the box 20 may constitute at least a part of the chassis of the vehicle 1000, or a portion of the box 20 may constitute at least a part of the crossbeam and longitudinal beam of the vehicle 1000.

A battery cell 10 refers to the smallest unit for storing and outputting electrical energy. The battery cell 10 may be a secondary battery or a primary battery. The battery cell 10 may include, but is not limited to, a metal battery, a lithium-sulfur battery, a sodium-ion battery, or a magnesium-ion battery. The battery cell 10 may have a cylindrical, flat, cuboid, or other shape.

Figure 3:
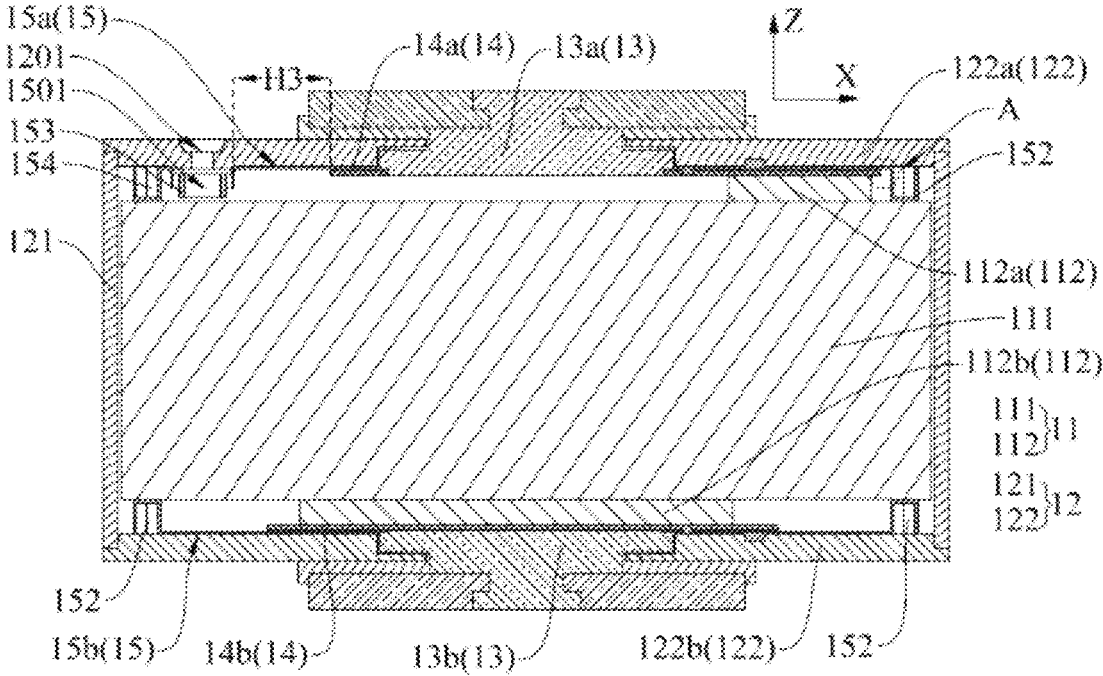
FIG. 3 is a cross-sectional view of a battery cell according to some embodiments of this application.

Referring to FIG. 3, FIG. 3 is a cross-sectional view of a battery cell 10 according to some embodiments of this application. The battery cell 10 may include an electrode assembly 11 and a casing 12.

The electrode assembly 11 is a component in the battery cell 10 where electrochemical reactions occur. The electrode assembly 11 is primarily formed by winding or stacking a positive electrode plate and a negative electrode plate, with a separator disposed between the positive electrode plate and the negative electrode plate. The portions of the positive electrode plate and the negative electrode plate containing active materials constitute a main body portion 111 of the electrode assembly 11, while the portions of the positive electrode plate and the negative electrode plate without active materials each constitute a tab 112. The tab 112 of the positive electrode plate is a positive tab, and the tab 112 of the negative electrode plate is a negative tab. The positive tab and the negative tab may be located together at one end of the main body portion 111 or respectively at two opposite ends of the main body portion 111.

In the battery cell 10, one or more electrode assemblies 11 may be provided.

In some contexts, the electrode assembly 11 may also be referred to as a jelly roll, a wound body, a stacked body, or the like.

In some embodiments, the battery cell 10 may further include an electrolyte. The electrolyte conducts ions between the positive electrode plate and the negative electrode plate. The electrolyte in the embodiments of this application may be liquid, gel, or solid.

The casing 12 may include a casing body 121 and an end cap 122, the casing body 121 and the end cap 122 being components that collectively define an internal environment of the battery cell 10. The internal environment defined by the casing body 121 and the end cap 122 is configured to accommodate the electrode assembly 11 and the electrolyte.

The casing body 121 and the end cap 122 may be independent components. Specifically, the casing body 121 has an opening, and the end cap 122 covers the opening of the casing body 121, to define the internal environment of the battery cell 10 together with the casing body 121, and to isolate the internal environment of the battery cell 10 from the external environment. Alternatively, the casing body 121 and the end cap 122 may be an integrated structure. Specifically, a common connection surface may be formed between the end cap 122 and the casing body 121 before the electrode assembly 11 is placed into the casing, and after the electrode assembly 11 is placed into the casing, and the electrode assembly 11 needs to be packaged, the end cap 122 covers the casing body 121.

One end cap 122 may be provided. Alternatively, two end caps 122 may be provided, with the two end caps 122 respectively disposed at two opposite ends of the casing body 121.

The casing body 121 may have a cylindrical, square, or other shape, which may be determined based on the specific shape and size of the electrode assembly 11. The materials of the casing body 121 and the end cap 122 may include various options, such as copper, iron, aluminum, stainless steel, aluminum alloy, or plastic.

In some embodiments, still referring to FIG. 3, the battery cell 10 may further include an electrode terminal 13. The electrode terminal 13 is a component with conductive properties. The electrode terminal 13 serves as a current transmission end of the battery cell 10 for transmitting current. The electrode terminal 13 may include, but is not limited to, a pole.

The electrode terminal 13 is conductively connected to the tab 112. Specifically, the electrode terminal 13 may be directly conductively connected to the tab 112, for example, by welding. Alternatively, an adapter 14 may be disposed between the electrode terminal 13 and the tab 112. The adapter 14 implements adaptation between the electrode terminal 13 and the tab 112 to enable current flow, thereby indirectly establishing conductive connection between the electrode terminal 13 and the tab 112.

The adapter 14 refers to a metal structure with conductive properties, such as, but not limited to, a copper busbar. The adapter 14 is disposed within the casing 12.

There are two electrode terminals 13. The two electrode terminals 13 are respectively a positive electrode terminal and a negative electrode terminal. The positive electrode terminal being conductively connected to the positive tab, and the negative electrode terminal being conductively connected to the negative tab.

The electrode terminal 13 is disposed on the casing 12. Specifically, the electrode terminal 13 may be disposed on the casing body 121 of the casing 12 or on the end cap 122 of the casing 12. For example, both the positive electrode terminal and the negative electrode terminal may be disposed on the casing body 121. Alternatively, as shown in FIG. 3, both the positive electrode terminal and the negative electrode terminal may be disposed on the end cap 122. Alternatively, one of the positive electrode terminal and the negative electrode terminal may be disposed on the casing body 121, and the other on the end cap 122.

The positive electrode terminal and the negative electrode terminal may be disposed at the same end of the casing 12. Alternatively, as shown in FIG. 3, the positive electrode terminal and the negative electrode terminal may be disposed at two opposite ends of the casing 12.

In some embodiments, referring to FIG. 3, the battery cell 10 may further include a lower plastic. The lower plastic is a plastic component primarily configured to be disposed in the internal environment of the battery cell 10 to offer the insulation performance.

The lower plastic is disposed within the casing 12 and at an end of the electrode assembly 11 having the tab 112, enabling insulation between the casing 12 and the adapter 14 and between the casing 12 and the electrode assembly 11.

There may be two lower plastics. One of the lower plastics is disposed on a side of the electrode assembly 11 having the positive tab, and the other lower plastic is disposed on a side of the electrode assembly 11 having the negative tab.

The lower plastic may be connected to the casing 12. Specifically, the lower plastic may be connected to the casing body 121 of the casing 12 or to the end cap 122 of the casing 12.

Figure 4:
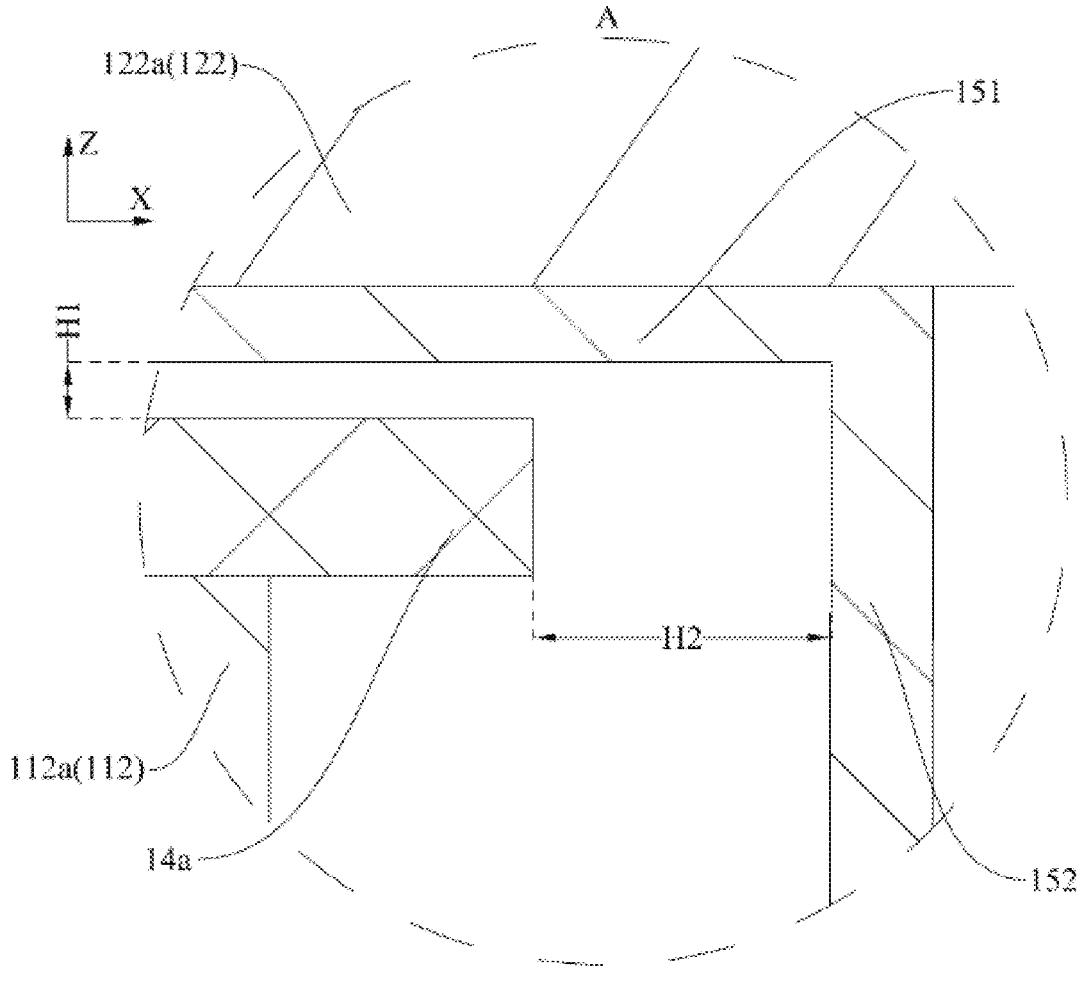
FIG. 4 is an enlarged view of portion A in FIG. 3.

Referring to FIG. 3 and FIG. 4 together, and in conjunction with other drawings, FIG. 4 is an enlarged view of portion A in FIG. 3. The enlarged view of FIG. 4 primarily illustrates the relationship between a first wall 122a, a first tab 112a, a first insulating member 15a, and a first adapter 14a described below. The battery cell 10 provided by the embodiments of this application includes the casing 12, the electrode assembly 11, the electrode terminal 13, the adapter 14, and the insulating member 15. The electrode assembly 11 is disposed within the casing 12. The adapter 14 is disposed within the casing 12, and the adapter 14 is conductively connected to the electrode assembly 11 and the electrode terminal 13. The insulating member 15 is disposed within the casing 12, at least a portion of the insulating member 15 being located between the adapter 14 and the casing 12, and at least a portion of the insulating member 15 being spaced apart from the adapter 14.

The adapter 14 being conductively connected to the electrode assembly 11 and the electrode terminal 13 means that the adapter 14 is conductively connected to the electrode assembly 11 and that the adapter 14 is conductively connected to the electrode terminal 13. The adapter 14 being conductively connected to the electrode assembly 11 means that the adapter 14 is connected to the electrode assembly 11 and that the adapter 14 is electrically conductive with the electrode assembly 11. The adapter 14 being conductively connected to the electrode terminal 13 means that the adapter 14 is connected to the electrode terminal 13 and that the adapter 14 is electrically conductive with the electrode terminal 13. Based on this, the adapter 14 can implement current flow between the electrode assembly 11 and the electrode terminal 13. The conductive connection manner may include, but is not limited to, one or more of welding, bonding, or other manners. Welding may include, but is not limited to, one or more of laser welding, ultrasonic welding, penetration welding, or other manners.

As shown in FIG. 3, the electrode assembly 11 includes a main body portion 111 and a tab 112 disposed on the main body portion 111, the adapter 14 being conductively connected to the tab 112 of the electrode assembly 11.

The insulating member 15 refers to a component configured to implement insulation between the casing 12 and the adapter 14. The insulating member 15 may be a plastic component, such as the lower plastic mentioned above. The insulating member 15 may alternatively be a structural component made of other materials with insulating properties.

At least a portion of the insulating member 15 is located between the adapter 14 and the casing 12, enabling at least the portion of the insulating member 15 to separate the adapter 14 from the casing 12, thereby implementing insulation between the adapter 14 and the casing 12.

As shown in FIG. 3 and FIG. 4, at least the portion of the insulating member 15 is located between a wall of the casing 12 along a first direction Z and the adapter 14, enabling at least the portion of the insulating member 15 to separate, at least along the first direction Z, the adapter 14 from the wall of the casing 12 along the first direction Z, thereby implementing insulation between the adapter 14 and the casing 12. FIG. 3 and FIG. 4 illustrate a planar coordinate system, with an axis X and axis Z being two mutually perpendicular coordinate axes in the planar coordinate system, that is, the axis Z is perpendicular to the axis X. The first direction Z is parallel to the axis Z.

In some possible designs, as shown in FIG. 3 and FIG. 4, the adapter 14 is disposed between the wall of the casing 12 along the first direction Z and the electrode assembly 11. In some other possible designs, the adapter 14 may alternatively be disposed between a wall of the casing 12 along a direction intersecting the first direction Z and the electrode assembly 11.

In some possible designs, as shown in FIG. 3 and FIG. 4, the electrode terminal 13 is disposed on the wall of the casing 12 along the first direction Z. In some other possible designs, the electrode terminal 13 may alternatively be disposed on a wall of the casing 12 along a direction intersecting the first direction Z.

The wall of the casing 12 along the first direction Z may be the casing body 121 or the end cap 122. As shown in FIG. 3, the two opposite walls of the casing 12 along the first direction Z may both be end caps 122. Alternatively, the two opposite walls of the casing 12 along the first direction Z may both be the casing bodies 121. Alternatively, one wall of the casing 12 along the first direction Z be the casing body 121, and the other wall may be the end cap 122.

As shown in FIG. 3, there are two tabs 112. The two tabs 112 are a first tab 112a and a second tab 112b. As an example, the first tab 112a is a positive tab, and the second tab 112b is a negative tab. Certainly, the first tab 112a may alternatively be a negative tab, and the second tab 112b is correspondingly a positive tab.

In some cases, the first direction Z is the length direction or height direction of the battery cell 10.

It should be noted that the battery cell 10 including the electrode terminal 13, the adapter 14, and the insulating member 15 means that the battery cell 10 includes at least one electrode terminal 13, at least one adapter 14, and at least one insulating member 15. It can be understood that the number of electrode terminals 13, adapters 14, and insulating members 15 may include, but is not limited to, the following three cases. First, the number of electrode terminals 13, adapters 14, and insulating members 15 is each one. Second, as shown in FIG. 3 and FIG. 4, the numbers of electrode terminals 13, adapters 14, and insulating members 15 are each two. Third, the numbers of electrode terminals 13 and adapters 14 are each two, and the number of insulating members 15 is one.

When the number of electrode terminals 13, adapters 14, and insulating members 15 each is one, the electrode terminal 13 may be a first electrode terminal 13a, the adapter 14 is a first adapter 14a, and the insulating member 15 is a first insulating member 15a. The first adapter 14a is conductively connected to the first tab 112a, the first adapter 14a is conductively connected to the first electrode terminal 13a, and at least a portion of the first insulating member 15a is located between the first adapter 14a and a wall of the casing 12 along the first direction Z to implement insulation between the first adapter 14a and the casing 12. Alternatively, the electrode terminal 13 may be a second electrode terminal 13b, the adapter 14 is a second adapter 14b, and the insulating member 15 is a second insulating member 15b. The second adapter 14b is conductively connected to the second tab 112b, the second adapter 14b is conductively connected to the second electrode terminal 13b, and at least a portion of the second insulating member 15b is located between the second adapter 14b and a wall of the casing 12 along the first direction Z to implement insulation between the casing 12 and the second adapter 14b.

When the number of electrode terminals 13, adapters 14, and insulating members 15 each is two, as shown in FIG. 3 and FIG. 4, the two electrode terminals 13 are respectively a first electrode terminal 13a and a second electrode terminal 13b, the two adapters 14 are respectively a first adapter 14a and a second adapter 14b, and the two insulating members 15 are respectively a first insulating member 15a and a second insulating member 15b. The first adapter 14a is conductively connected to the first tab 112a, and the first adapter 14a is conductively connected to the first electrode terminal 13a. The second adapter 14b is conductively connected to the second tab 112b, and the second adapter 14b is conductively connected to the second electrode terminal 13b. At least a portion of the first insulating member 15a is located between the first adapter 14a and a wall of the casing 12 along the first direction Z to implement insulation between the first adapter 14a and the casing 12. At least a portion of the second insulating member 15b is located between the second adapter 14b and a wall of the casing 12 along the first direction Z to implement insulation between the casing 12 and the second adapter 14b.

When the numbers of electrode terminals 13 and adapters 14 are each two, and the number of insulating members 15 is one, the two electrode terminals 13 are respectively a first electrode terminal 13a and a second electrode terminal 13b, and the two adapters 14 are respectively a first adapter 14a and a second adapter 14b. The first adapter 14a is conductively connected to the first tab 112a, and the first adapter 14a is conductively connected to the first electrode terminal 13a. The second adapter 14b is conductively connected to the second tab 112b, and the second adapter 14b is conductively connected to the second electrode terminal 13b. The insulating member 15 may be a first insulating member 15a, at least a portion of the first insulating member 15a being located between the first adapter 14a and a wall of the casing 12 along the first direction Z to implement insulation between the first adapter 14a and the casing 12. Alternatively, the insulating member 15 may be a second insulating member 15b, at least a portion of the second insulating member 15b being located between the second adapter 14b and a wall of the casing 12 along the first direction Z to implement insulation between the casing 12 and the second adapter 14b.

It should be further noted that the wall of the casing 12 along the first direction Z includes a first wall 122a and a second wall 122b.

At least a portion of the first insulating member 15a being located between the casing 12 and the first adapter 14a means that at least the portion of the first insulating member 15a is located between the wall of the casing 12 along the first direction Z and the first adapter 14a, that is, at least the portion of the first insulating member 15a is located between the first wall 122a and the first adapter 14a along the first direction Z.

At least a portion of the second insulating member 15b being located between the casing 12 and the second adapter 14b means that at least the portion of the second insulating member 15b is located between the wall of the casing 12 along the first direction Z and the second adapter 14b, that is, at least the portion of the second insulating member 15b is located between the second wall 122b and the second adapter 14b along the first direction Z.

The first wall 122a may be provided on the casing body 121 or the end cap 122. The second wall 122b may be the casing body 121 or the end cap 122. As an example, as shown in FIG. 3, both the first wall 122a and the second wall 122b are provided on the end cap 122.

In some possible designs, as shown in FIG. 3, the first wall 122a and second wall 122b may be two opposite walls of the casing 12 along the first direction Z. Based on this, the first tab 112a and the second tab 112b are respectively disposed at two opposite ends of the electrode assembly 11 along the first direction Z, the first adapter 14a and the second adapter 14b are also respectively disposed at two opposite ends of the electrode assembly 11 along the first direction Z, the first insulating member 15a and the second insulating member 15b are also respectively disposed at two opposite ends of the electrode assembly 11 along the first direction Z, and the first electrode terminal 13a and the second electrode terminal 13b are also respectively disposed at two opposite ends of the electrode assembly 11 along the first direction Z. Furthermore, at least a portion of the first insulating member 15a is located between the first wall 122a and the first adapter 14a along the first direction Z, and at least a portion of the second insulating member 15b is located between the second wall 122b and the second adapter 14b along the first direction Z.

In some other possible designs, the first wall 122a and the second wall 122b may be the same wall of the casing 12 along the first direction Z. Based on this, the first tab 112a and the second tab 112b are disposed at the same end of the electrode assembly 11 along the first direction Z, the first adapter 14a and the second adapter 14b are also disposed at the same end of the electrode assembly 11 along the first direction Z, the first insulating member 15a and the second insulating member 15b are also disposed at the same end of the electrode assembly 11 along the first direction Z, and the first electrode terminal 13a and the second electrode terminal 13b are also disposed at the same end of the electrode assembly 11 along the first direction Z.

At least a portion of the insulating member 15 being spaced apart from the adapter 14 means that at least the portion of the insulating member 15 is separated from the adapter 14 without direct contact. The space formed by the spacing between at least the portion of the insulating member 15 and the adapter 14 may be filled with air or by other components of the battery cell 10.

At least a portion of the insulating member 15 being spaced apart from the adapter 14 may include the case where the insulating member 15 is entirely spaced apart from the adapter 14, or the case where one portion of the insulating member 15 is spaced apart from the adapter 14, and the other portion of the insulating member 15 is in contact with the adapter 14.

According to the battery cell 10 provided by the embodiments of this application, spacing at least the portion of the insulating member 15 apart from the adapter 14 can reduce heat conduction between the adapter 14 and the insulating member 15, and therefore can mitigate the problem that heat from the adapter 14 being conducted to the insulating member 15 causes failure of insulation performance of the insulating member 15. This enables the insulating member 15 to achieve good insulation effects between the adapter 14 and the casing 12.

It can be understood that the adapter 14 in various embodiments of this application may be the first adapter 14a or the second adapter 14b; the tab 112 may be the first tab 112a or the second tab 112b; the electrode terminal 13 may be the first electrode terminal 13a or the second electrode terminal 13b; and the insulating member 15 may be the first insulating member 15a or the second insulating member 15b. In addition, when the tab 112 is the first tab 112a, the electrode terminal 13 is the first electrode terminal 13a, the adapter 14 is the first adapter 14a, and the insulating member 15 is the first insulating member 15a. When the tab 112 is the second tab 112b, the electrode terminal 13 is the second electrode terminal 13b, the adapter 14 is the second adapter 14b, and the insulating member 15 is the second insulating member 15b.

In some embodiments, as shown in FIG. 3, the first electrode terminal 13a is disposed on the first wall 122a, and the second electrode terminal 13b is disposed on the second wall 122b.

In some embodiments, still referring to FIG. 3 and FIG. 4, at least a portion of the insulating member 15 may alternatively be located between a wall of the casing 12 along the first direction Z and the electrode assembly 11 to separate the electrode assembly 11 from the wall of the casing 12 along the first direction Z. This enables the insulating member 15 to implement insulation between the electrode assembly 11 and the casing 12.

In some embodiments, still referring to FIG. 3 and FIG. 4, and in conjunction with other drawings, the adapter 14 is disposed at an end of the electrode assembly 11 along the first direction Z. The insulating member 15 includes a body portion 151, and along the first direction Z, the body portion 151 is located between the adapter 14 and the casing 12 and is spaced apart from the adapter 14 along the first direction Z.

The body portion 151 is a part of the insulating member 15 and the body portion 151 also has insulating properties.

It can be understood that the body portion 151 is located between a wall of the casing 12 along the first direction Z and the adapter 14 to implement insulation between the adapter 14 and the casing 12.

With the adapter 14 being disposed at an end of the electrode assembly 11 along the first direction Z, and the body portion 151 being located between a wall of the casing 12 along the first direction Z and the adapter 14, the adapter 14 and the body portion 151 are spaced apart along the first direction Z, the adapter 14 is disposed between the wall of the casing 12 along the first direction Z and the electrode assembly 11, and the electrode assembly 11 is disposed on a side of the adapter 14 along the first direction Z farther away from the body portion 151. Based on this, the adapter 14 is located on a side of the body portion 151 facing towards the electrode assembly 11 along the first direction Z.

The insulating member 15 may be the first insulating member 15a or the second insulating member 15b. That is, both the first insulating member 15a and the second insulating member 15b may include the body portion 151.

It should be noted that, as shown in FIG. 4, FIG. 4 primarily illustrates the positional relationship between the first wall 122a, the first tab 112a, the first insulating member 15a, and the first adapter 14a described below. The body portion 151 of the first insulating member 15a is located between a wall of the casing 12 along the first direction Z and the first adapter 14a, that is, the body portion 151 of the first insulating member 15*a* is located between a wall of the casing 12 along the first direction Z close to the first adapter 14*a* and the first adapter 14*a*. In other words, the body portion 151 of the first insulating member 15*a* is located between the first wall 122*a* of the casing 12 and the first adapter 14*a* along the first direction Z. Furthermore, the body portion 151 of the first insulating member 15*a* is spaced apart from the first adapter 14*a* along the first direction Z.

It should also be noted that the body portion 151 of the second insulating member 15*b* is located between a wall of the casing 12 along the first direction Z and the second adapter 14*b*, that is, the body portion 151 of the second insulating member 15*b* is located between a wall of the casing 12 along the first direction Z having the second adapter 14*b* and the second adapter 14*b*. In other words, the body portion 151 of the second insulating member 15*b* is located between the second wall 122*b* of the casing 12 and the second adapter 14*b* along the first direction Z. Furthermore, the body portion 151 of the second insulating member 15*b* is spaced apart from the second adapter 14*b* along the first direction Z.

This arrangement enables the insulating member 15 to implement insulation between the casing 12 and the adapter 14, and the body portion 151 of the insulating member 15 to be spaced apart from the adapter 14, so as to reduce heat conduction between the adapter 14 and the body portion 151, thereby mitigating the problem of insulation performance failure of the body portion 151.

Figure 5:
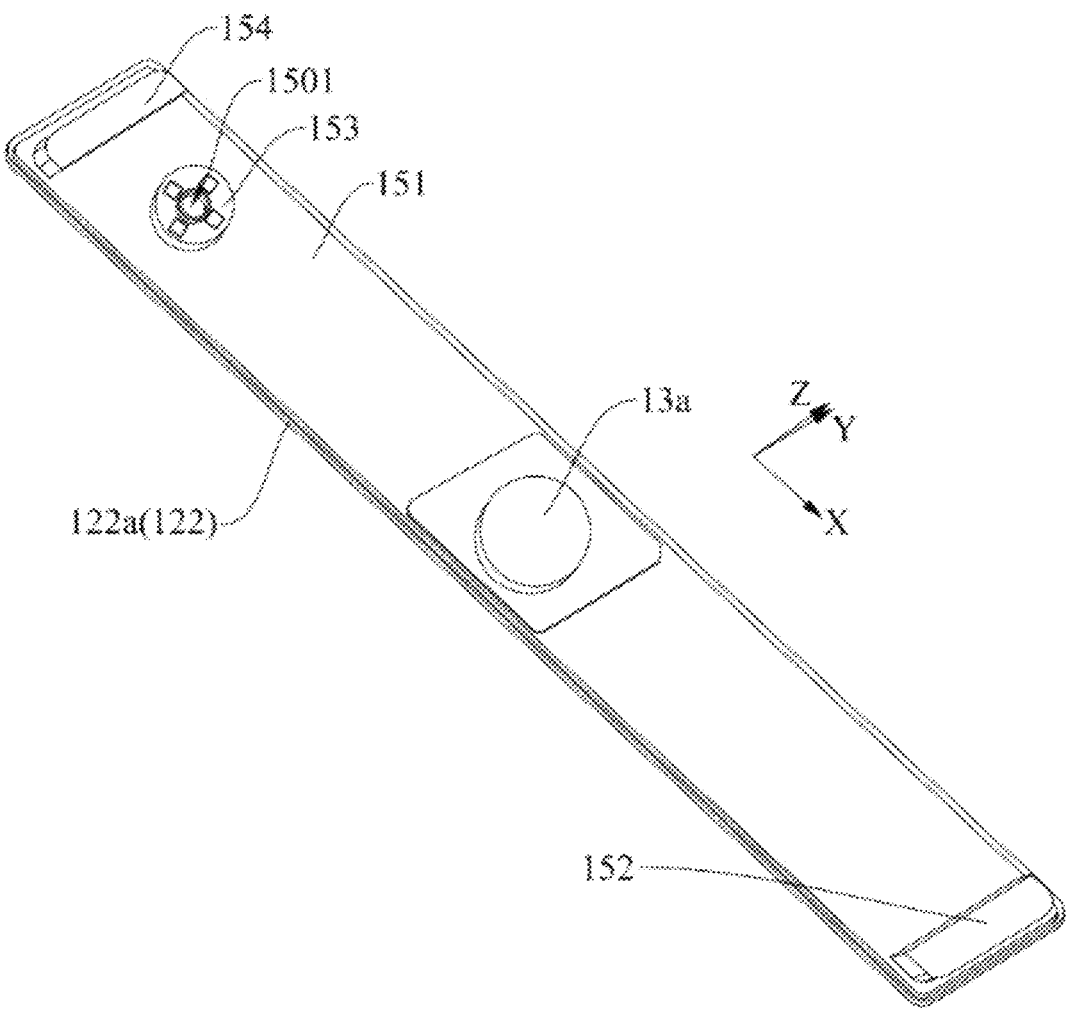
FIG. 5 is a schematic diagram of fitting between an end cap and an insulating member of a battery cell according to some embodiments of this application.

In some embodiments, referring to FIG. 3 to FIG. 5 together, and in conjunction with other drawings, FIG. 5 is a schematic diagram of fitting among an end cap 122, a first insulating member 15*a*, and a first electrode terminal 13*a* of the battery cell 10 according to some embodiments of this application. The insulating member 15 further includes a first boss 152. The first boss 152 is disposed on a side of the body portion 151 facing towards the electrode assembly 11 along the first direction Z. The adapter 14 is spaced apart from the first boss 152 along a second direction X, the second direction X intersecting the first direction Z.

The first boss 152 refers to a component disposed on a side of the body portion 151 facing towards the electrode assembly 11 along the first direction Z, being a part of the insulating member 15 and also having insulating properties. The first boss 152 is configured to constrain a separator wrapped around the exterior of the electrode assembly 11, ensuring, to some extent, the insulation effect of the separator between the electrode assembly 11 and the casing 12.

It should be noted that, along the first direction Z, the body portion 151 of the first insulating member 15*a* is located between the first wall 122*a* of the casing 12 and the first adapter 14*a*, so that the first adapter 14*a* is located on a side of the body portion 151 of the first insulating member 15*a* facing towards the electrode assembly 11 along the first direction Z. Based on this, both the first boss 152 of the first insulating member 15*a* and the first adapter 14*a* are disposed on the side of the body portion 151 of the first insulating member 15*a* facing towards the electrode assembly 11 along the first direction Z, and the first boss 152 of the first insulating member 15*a* and the first adapter 14*a* are spaced apart along the second direction X.

It should also be noted that, along the first direction Z, the body portion 151 of the second insulating member 15*b* is located between the second wall 122*b* of the casing 12 and the second adapter 14*b*, so that the second adapter 14*b* is located on a side of the body portion 151 of the second insulating member 15*b* facing towards the electrode assembly 11 along the first direction Z. Based on this, both the first boss 152 of the second insulating member 15*b* and the second adapter 14*b* are disposed on the side of the body portion 151 of the second insulating member 15*b* facing towards the electrode assembly 11 along the first direction Z, and the first boss 152 of the second insulating member 15*b* and the first adapter 14*a* are spaced apart along the second direction X.

Intersection means being non-parallel. Two intersecting directions are not parallel, meaning that the two directions form an included angle greater than 0° and less than 180°. The two directions may be perpendicular or non-perpendicular, and the two directions may be located on two different planes or on the same plane.

The second direction X refers to a direction intersecting the first direction Z. Specifically, the second direction X intersecting the first direction Z means that the second direction X is not parallel to the first direction Z, that is, the first direction Z and the second direction X may form an included angle greater than 0° and less than 180°. The first direction Z and the second direction X may be mutually perpendicular or non-perpendicular. The first direction Z and the second direction X may be intersecting directions located on the same plane, or directions on different planes, and a projection of the second direction X on a plane containing the first direction Z may intersect the first direction Z.

FIG. 5 illustrates a spatial coordinate system, with the axis X, axis Y, and axis Z being three pairwise perpendicular coordinate axes in the spatial coordinate system. That is, the axis X is perpendicular to the axis Y, the axis X is perpendicular to the axis Z, and the axis Y is perpendicular to the axis Z. The planar coordinate systems shown in FIG. 3 and FIG. 4 are a planar coordinate system formed by the axis X and axis Z of the spatial coordinate system in FIG. 5.

As an example, as shown in FIG. 3 and FIG. 4, the second direction X is parallel to the axis X, that is, the second direction X is perpendicular to the first direction Z.

With the foregoing technical solution, the adapter 14 is spaced apart not only from the body portion 151 of the insulating member 15 but also from the first boss 152 of the insulating member 15. This can desirably reduce heat conduction between the adapter 14 and the insulating member 15, thereby mitigating the problem that heat from the adapter 14 causes insulation performance failure of the insulating member 15, specifically including insulation performance failure of the body portion 151 of the insulating member 15 and insulation performance failure of the first boss 152.

In some embodiments, still referring to FIG. 3 to FIG. 5, and in conjunction with other drawings, the wall of the casing 12 along the first direction Z is provided with an electrolyte injection hole 1201. The insulating member 15 further includes a protruding post 153, and the protruding post 153 is disposed on a side of the body portion 151 facing towards the electrode assembly 11 along the first direction Z. The protruding post 153 is in communication with the electrolyte injection hole 1201 and with an interior of the casing 12. The adapter 14 is spaced apart from the protruding post 153 along a second direction X, the second direction X intersecting the first direction Z.

The electrolyte injection hole 1201 refers to a hole provided on the casing 12 for allowing electrolyte to enter the internal environment of the battery cell 10. Specifically, the electrolyte injection hole 1201 is provided on the wall of the casing 12 along the first direction Z. The electrolyte injection hole 1201 may be provided on the casing body 121 of the casing 12 or on the end cap 122 of the casing 12.

The protruding post 153 refers to a component disposed on a side of the body portion 151 facing towards the electrode assembly 11 along the first direction Z, being a part of the insulating member 15 and also having insulating properties.

It can be understood that the insulating member 15 is provided with a through hole 1501, the through hole 1501 penetrating the body portion 151 and the protruding post 153 of the insulating member 15 along the first direction Z. The through hole 1501 is in communication with the internal environment of the battery cell 10 and with the electrolyte injection hole 1201. In addition, the electrolyte injection hole 1201 is configured to communicate with the external environment of the battery cell 10. This allows the external electrolyte to enter the internal environment of the battery cell 10 through the electrolyte injection hole 1201 and the through hole 1501 sequentially, thereby wetting the electrode assembly 11.

As shown in FIG. 3, the electrolyte injection hole 1201 and the by through hole 1501 are sequentially arranged and in communication along the first direction Z.

The protruding post 153 serves multiple purposes. For example, in some possible designs, the protruding post 153 may buffer the electrolyte passing through the electrolyte injection hole 1201 to mitigate the problem that excessively large electrolyte pressure damages the electrode assembly 11. For example, in some other possible designs, the protruding post 153 may guide the electrolyte passing through the electrolyte injection hole 1201 to allow the electrolyte to enter the electrode assembly 11 more quickly.

It should be noted that, as shown in FIG. 3 to FIG. 5, along the first direction Z, the body portion 151 is located between a wall of the casing 12 along the first direction Z having the adapter 14 and the adapter 14, so that the adapter 14 is located on a side of the body portion 151 facing towards the electrode assembly 11 along the first direction Z. Based on this, both the protruding post 153 and the adapter 14 are disposed on the side of the body portion 151 facing towards the electrode assembly 11 along the first direction Z, and the protruding post 153 and the adapter 14 are spaced apart along the second direction X.

As an example, as shown in FIG. 3 to FIG. 5, the first tab 112a is a positive tab, and the electrolyte injection hole 1201 is provided on a wall of the casing 12 having the first insulating member 15a along the first direction Z, that is, the electrolyte injection hole 1201 is provided on the first wall 122a. The first insulating member 15a further includes a protruding post 153, the protruding post 153 of the first insulating member 15a and the first adapter 14a are both disposed on a side of the body portion 151 of the first insulating member 15a facing towards the electrode assembly 11 along the first direction Z, and the protruding post 153 of the first insulating member 15a is spaced apart from the first adapter 14a along the second direction X.

With the foregoing technical solution, the adapter 14 is spaced apart not only from the body portion 151 of the insulating member 15 but also from the protruding post 153 of the insulating member 15. This can desirably reduce heat conduction between the adapter 14 and the insulating member 15, thereby mitigating the problem that heat from the adapter 14 causes insulation performance failure of the insulating member 15.

It should be further noted that, as shown in FIG. 3 to FIG. 5, the first boss 152 and the protruding post 153 are spaced apart along the second direction X.

In some embodiments, referring to FIG. 3 to FIG. 5, the insulating member 15 may further include a second boss

154. The second boss 154 is disposed on a side of the body portion 151 facing towards the electrode assembly 11 along the first direction Z. In addition, along the second direction X, the second boss 154 is disposed at an end of the protruding post 153 farther away from the first boss 152.

In some embodiments, still referring to FIG. 3, a wall of the casing 12 along the first direction Z having the second insulating member 15b may not be provided with an electrolyte injection hole 1201, that is, the second wall 122b is not provided with an electrolyte injection hole 1201. In this case, the insulating member 15 may not be provided with the protruding post 153 and the second boss 154. That is, one end or two opposite ends of the second adapter 14b along the second direction X may be provided with the first boss 152, and along the second direction X, the first bosses 152 at the two opposite ends of the second adapter 14b are spaced apart from the second adapter 14b along the second direction X.

It can be understood that at least the portion of the insulating member 15 being spaced apart from the adapter 14 may include the body portion 151 of the insulating member 15 being spaced apart from the adapter 14 along the first direction Z, the first boss 152 of the insulating member 15 being spaced apart from the adapter 14 along the second direction X, or the protruding post 153 of the insulating member 15 being spaced apart from the adapter 14 along the second direction X.

In some embodiments, one portion of the insulating member 15 is spaced apart from the adapter 14. The "portion of the insulating member 15" may include at least one of the body portion 151, the first boss 152, or the protruding post 153. The other portion of the insulating member 15 is in contact with the adapter 14, that is, the insulating member 15 further has a portion configured to contact the adapter 14. The portion of the insulating member 15 configured to contact the adapter 14 may contact the adapter 14 along at least one of the first direction Z, the second direction X, or a third direction Y.

As an example, the portion of the insulating member 15 configured to contact the adapter 14 may be inserted into the adapter 14 along the first direction Z and contact the adapter 14 along at least one of the first direction Z, the second direction X, or the third direction Y to achieve positioning between the insulating member 15 and the adapter 14.

As another example, the portion of the insulating member 15 configured to contact the adapter 14 may be located on a side of the adapter 14 along the third direction Y and contact the adapter 14 along the third direction Y to achieve limitation of the adapter 14 and the insulating member 15 in the third direction Y.

The third direction Y intersects the first direction Z, and the third direction Y intersects the second direction X. The meaning of this intersection can be referred to the explanation of the intersection between the first direction Z and the second direction X, and will not be repeated herein. As an example, the third direction Y is parallel to the axis Y.

In some embodiments, still referring to FIG. 3 to FIG. 5, and in conjunction with other drawings, a gap formed by the spacing between at least a portion of the insulating member 15 and the adapter 14 is greater than 0.1 mm.

At least the portion of the insulating member 15 is spaced apart from the adapter 14, forming a gap. The gap is greater than 0.1 mm.

In some possible designs, the body portion 151 of the insulating member 15 is spaced apart from the adapter 14 along the first direction Z, forming a first gap H1. The first gap H1 is greater than 0.1 mm.

In some possible designs, the first boss 152 of the insulating member 15 is spaced apart from the adapter 14 along the second direction X, forming a second gap H2. The second gap H2 is greater than 0.1 mm.

In some possible designs, the protruding post 153 of the insulating member 15 is spaced apart from the adapter 14 along the second direction X, forming a third gap H3. The third gap H3 is greater than 0.1 mm.

Based on this, the gap formed by the spacing between at least the portion of the insulating member 15 and the adapter 14 being greater than 0.1 mm may include at least one of the above three possible designs.

This arrangement ensures a relatively large gap between at least the portion of the insulating member 15 and the adapter 14, thereby reducing heat conduction between the adapter 14 and the insulating member 15, and facilitating mitigation of the problem that heat from the adapter 14 causes insulation performance failure of the insulating member 15.

In some embodiments, referring to FIG. 3 to FIG. 5 together, and in conjunction with other drawings, the gap formed by the spacing between at least the portion of the insulating member 15 and the adapter 14 is less than 2 mm.

It can be understood that the gap formed by the spacing between at least the portion of the insulating member 15 and the adapter 14 being greater than 0.1 mm and less than 2 mm may be 0.2 mm, 0.5 mm, 0.8 mm, 1 mm, 1.2 mm, 1.4 mm, 1.5 mm, 1.8 mm, 1.9 mm, or the like.

In some possible designs, the first gap H1 is less than 2 mm.

In some possible designs, the second gap H2 is less than 2 mm.

In some possible designs, the third gap H3 is less than 2 mm.

Based on this, the gap formed by the spacing between at least the portion of the insulating member 15 and the adapter 14 being less than 2 mm may include at least one of the above three possible designs.

This arrangement ensures a relatively large but not excessively large gap between at least the portion of the insulating member 15 and the adapter 14. This, in addition to mitigating the problem that heat from the adapter 14 causes insulation performance failure of the insulating member 15, can enhance the compactness of the arrangement of the adapter 14 and the insulating member 15, thereby helping to achieve structural compactness of the battery cell 10 and improving the energy density of the battery cell 10.

In some embodiments, the electrode assembly 11 is welded to the adapter 14.

Specifically, the tab 112 of the electrode assembly 11 is welded to the adapter 14.

Specifically, the first tab 112a is welded to the first adapter 14a, and the second tab 112b is welded to the second adapter 14b.

Welding the electrode assembly 11 to the adapter 14 can establish a conductive connection between the electrode assembly 11 and the adapter 14, facilitating adaptation between the electrode assembly 11 and the electrode terminal 13.

In some embodiments, referring to FIG. 3 and FIG. 4 together, and in conjunction with other drawings, a portion of the adapter 14 configured to be welded to the electrode assembly 11 is spaced apart from the insulating member 15.

It should be noted that one portion of the adapter 14 is configured to be welded to the electrode assembly 11 to achieve conductive connection between the adapter 14 and the electrode assembly 11. During the welding process of the electrode assembly 11 and the adapter 14, the temperature of the portion of the adapter 14 configured to be welded to the electrode assembly 11 rises sharply.

Spacing the portion of the adapter 14 configured to be welded to the electrode assembly 11 from the insulating member 15 can reduce the speed of conducting heat generated from the welding process of the electrode assembly 11 and the adapter 14 to the insulating member 15, thereby mitigating the problem of insulation performance failure of the insulating member 15.

It should be further noted that the first weld mark and the second weld mark described below are both disposed on the portion of the adapter 14 configured to be welded to the electrode assembly 11.

The portion of the adapter 14 configured to be welded to the electrode assembly 11 may be spaced apart from the body portion 151 of the insulating member 15 along the first direction Z or from the first boss 152 along the second direction X. In addition, the adapter 14 may be divided into two portions, one of which is configured to be welded to the electrode assembly 11. Along the second direction X, the other portion of the adapter 14 may be located between the portion of the adapter 14 configured to be welded to the electrode assembly 11 and the protruding post 153, so that the portion of the adapter 14 configured to be welded to the electrode assembly 11 may also be spaced apart from the protruding post 153.

Figure 6:
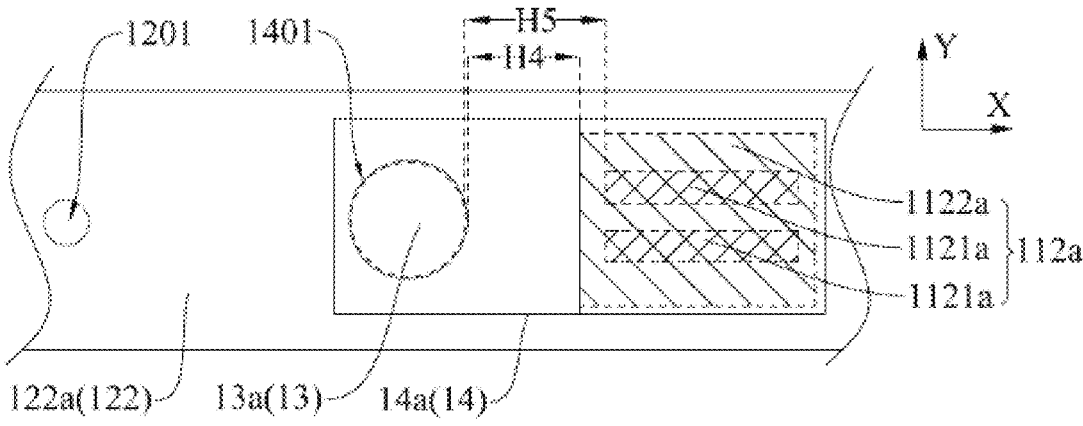
FIG. 6 is a top view of fitting between a first adapter and the end cap of the battery cell provided by FIG. 3.

In some embodiments, referring to FIG. 3 and FIG. 6 together, and in conjunction with other drawings, FIG. 6 is a schematic diagram of fitting between an end cap 122 and a first adapter 14a of a battery cell 10 according to some embodiments of this application. The schematic diagram is a view of the end cap 122 and the first adapter 14a in a direction from the second adapter 14b toward the first adapter 14a along the first direction Z. Dashed lines in the schematic diagram indicate projections of the first electrode terminal 13a, the first connection portion 1121a, and the second connection portion 1122a on the first adapter 14a. The adapter 14 is provided with a positioning hole 1401, and the electrode terminal 13 is inserted into the positioning hole 1401.

In some possible designs, the positioning hole 1401 penetrates an end of the adapter 14 farther away from the electrode assembly 11 along the first direction Z. In some other possible designs, as shown in FIG. 3 and FIG. 6, the positioning hole 1401 penetrates two opposite ends of the adapter 14 along the first direction Z. The electrode terminal 13 is disposed on a wall of the casing 12 along the first direction Z, and the electrode terminal 13 is inserted into the positioning hole 1401 along the first direction Z.

In some possible designs, as shown in FIG. 3 and FIG. 6, the first adapter 14a is provided with the positioning hole 1401, and the first electrode terminal 13a is inserted into the positioning hole 1401 of the first adapter 14a. In some possible designs, the second adapter 14b may also be provided with the positioning hole 1401, and the second electrode terminal 13b is inserted into the positioning hole 1401 of the second adapter 14b. In some possible designs, both the first adapter 14a and the second adapter 14b are provided with the positioning hole 1401, the first electrode terminal 13a being inserted into the positioning hole 1401 on the first adapter 14a, and the second electrode terminal 13b being inserted into the positioning hole 1401 on the second adapter 14b.

Inserting the electrode terminal 13 into the positioning hole 1401 facilitates positioning of the electrode terminal 13 on the battery cell 10, and facilitates conductive connection between the electrode terminal 13 and the adapter 14 is achieved.

In some possible designs, the electrode terminal 13 and the adapter 14 may be conductively connected through penetration welding, enabling sealing of the positioning hole 1401. In addition, the welding technology is simple, requiring only sequential welding, and therefore is easy to implement and cost-effective.

In some embodiments, referring to FIG. 3 and FIG. 6 together, and in conjunction with other drawings, the electrode assembly 11 is welded to the adapter 14, and a weld mark formed by welding the electrode assembly 11 to the adapter 14 is spaced apart from the positioning hole 1401.

It can be understood that the tab 112 of the electrode assembly 11 is welded to the adapter 14 to establish an electrical conduction, forming a weld mark between the tab 112 and the adapter 14. The weld mark refers to a structure formed by solidification of welding material used during the welding process of the tab 112 and the adapter 14. In addition, the weld mark is spaced apart from the positioning hole 1401.

The weld mark formed by welding the electrode assembly 11 to the adapter 14 may be spaced apart from the positioning hole 1401 along a direction intersecting the first direction Z. As an example, the weld mark formed by welding the electrode assembly 11 to the adapter 14 is spaced apart from the positioning hole 1401 along the second direction X.

FIG. 6 illustrates a planar coordinate system, with the axis X and axis Y being two perpendicular coordinate axes in the planar coordinate system, that is, the axis X is perpendicular to the axis Y. The planar coordinate system in FIG. 6 is formed by the axis X and axis Y of the spatial coordinate system in FIG. 5.

As an example, as shown in FIG. 6, the weld mark formed by welding the first tab 112*a* to the first adapter 14*a* is spaced apart from the positioning hole 1401 on the first adapter 14*a*. In addition, the weld mark formed by welding the first tab 112*a* to the first adapter 14*a* may include the first connection portion 1121*a* described below, or may include both the first connection portion 1121*a* and the second connection portion 1122*a* described below. Certainly, when the second adapter 14*b* is also provided with the positioning hole 1401, the weld mark formed by welding the second tab 112*b* to the second adapter 14*b* may also be spaced apart from the positioning hole 1401 on the second adapter 14*b*. In addition, the weld mark formed by welding the second tab 112*b* to the second adapter 14*b* may include the third connection portion 1121*b* described below, or may include both the third connection portion 1121*b* and the fourth connection portion 1122*b* described below.

This arrangement can mitigate the problem that welding material used in the welding process of the tab 112 and the adapter 14 flows into the positioning hole 1401, thereby mitigating interference of the welding technology of the tab 112 and the adapter 14 with the function of the positioning hole 1401 in positioning the electrode terminal 13, and facilitating assembly of the battery cell 10.

Figure 7:
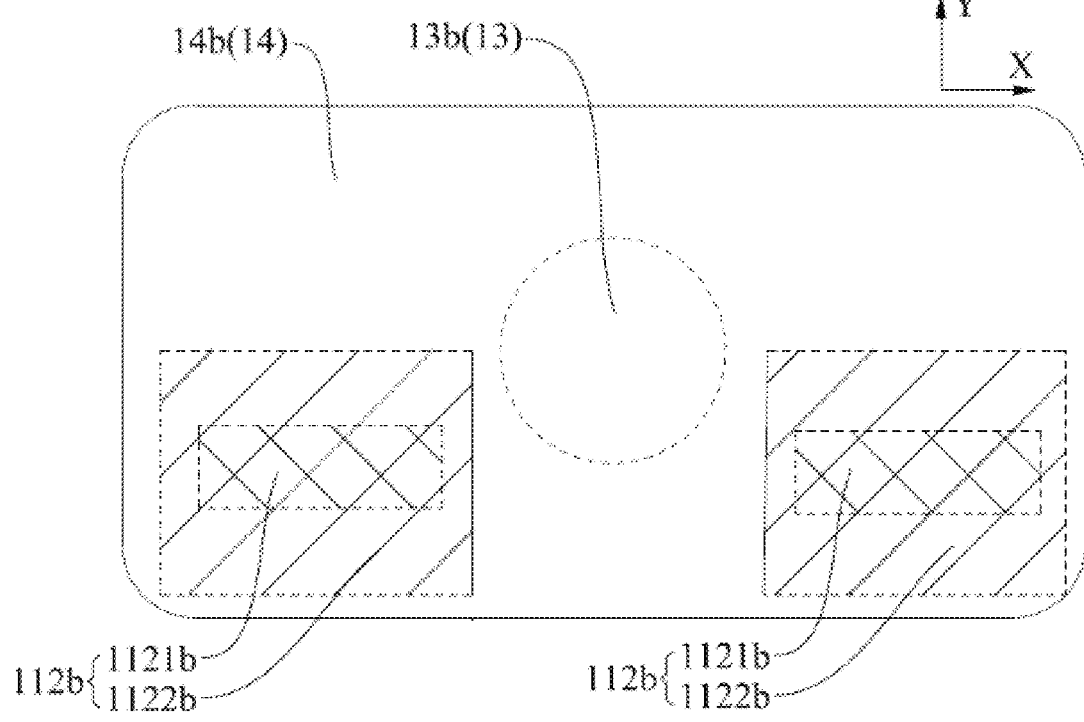
FIG. 7 is a schematic diagram of a second adapter of the battery cell provided by FIG. 3.

In some embodiments, referring to FIG. 3, FIG. 6, and FIG. 7 together, and in conjunction with other drawings, FIG. 7 is a schematic diagram of a second adapter 14*b* of a battery cell 10 according to some embodiments of this application. The schematic diagram is a view of the second adapter 14*b* in a direction from the first adapter 14*a* toward the second adapter 14*b* along the first direction Z. Dashed lines in the schematic diagram indicate projections of the second electrode terminal 13*b*, the third connection portion

1121*b*, and the fourth connection portion 1122*b* on the second adapter 14*b*. The electrode assembly 11 includes a main body portion 111 and a tab 112 disposed on the main body portion 111. The tab 112 includes a plurality of sub-tabs 112, the plurality of sub-tabs 112 being welded to form a first weld mark. At least a portion of the first weld mark is welded to the adapter 14 to form a second weld mark, the second weld mark being spaced apart from the positioning hole 1401.

The sub-tabs 112 are partial structures of the tab 112, and a plurality of sub-tabs 112 may constitute the tab 112. The sub-tabs 112 are connected to the main body portion 111.

It should be noted that in welding the tab 112 to the adapter 14, the plurality of sub-tabs 112 of the tab 112 may be first pre-welded. After the plurality of sub-tabs 112 of the tab 112 are pre-welded, the first weld mark is formed on the tab 112. Then, at least a portion of the first weld mark is welded to the adapter 14. After at least the portion of the first weld mark is welded to the adapter 14, the second weld mark is formed between the first weld mark and the adapter 14.

It can be understood that the weld mark formed by welding the electrode assembly 11 to the adapter 14 may include the second weld mark, the second weld mark being spaced apart from the positioning hole 1401.

The tab 112 may be the first tab 112*a* or the second tab 112*b*. Both the first tab 112*a* and the second tab 112*b* may include sub-tabs 112, the sub-tabs 112 of the first tab 112*a* being first sub-tabs 112, and the sub-tabs 112 of the second tab 112*b* being second sub-tabs 112. That is, the plurality of first sub-tabs 112 constitute the first tab 112*a*, and the plurality of second sub-tabs 112 constitute the second tab 112*b*.

It can be understood that the sub-tabs 112 in various embodiments of this application may be the first sub-tabs 112 or the second sub-tabs 112.

As shown in FIG. 6, the plurality of first sub-tabs 112 are welded to form the first weld mark on the first tab 112*a*. At least a portion of the first weld mark on the first tab 112*a* is welded to the first adapter 14*a* to form the second weld mark between the first weld mark on the first tab 112*a* and the first adapter 14*a*.

As shown in FIG. 7, the plurality of second sub-tabs 112 are welded to form the first weld mark on the second tab 112*b*. At least a portion of the first weld mark on the second tab 112*b* is welded to the second adapter 14*b* to form the second weld mark between the first weld mark on the second tab 112*b* and the second adapter 14*b*.

As an example, as shown in FIG. 6, the second weld mark between the first weld mark of the first tab 112*a* and the first adapter 14*a* is spaced apart from the positioning hole 1401 on the first adapter 14*a*. When the second adapter 14*b* is also provided with the positioning hole 1401, the second weld mark between the first weld mark of the second tab 112*b* and the second adapter 14*b* may also be spaced apart from the positioning hole 1401 on the second adapter 14*b*.

It should be further noted that the planar coordinate system in FIG. 7 is formed by the axis X and axis Y of the spatial coordinate system in FIG. 5.

With the foregoing technical solution, the weld mark formed by welding the electrode assembly 11 to the adapter 14 may include the second weld mark, the second weld mark being spaced apart from the positioning hole 1401. This can mitigate the problem that welding material used in the welding process of the tab 112 and the adapter 14 flows into the positioning hole 1401, thereby reducing interference of the welding technology of the tab 112 and the adapter 14 with the function of the positioning hole 1401 in positioning the electrode terminal 13, and facilitating assembly of the battery cell 10. Additionally, welding the plurality of sub-tabs 112 of the tab 112 to form the first weld mark facilitates the welding operation between the tab 112 and the adapter 14.

In some embodiments, the plurality of sub-tabs 112 are welded and welded to the adapter 14 to form the first weld mark, the first weld mark being spaced apart from the positioning hole 1401.

It can be understood that during the welding process of the plurality of sub-tabs 112, pre-welding is performed together with the adapter 14 to form the first weld mark.

It can also be understood that the weld mark formed by welding the electrode assembly 11 to the adapter 14 may further include the first weld mark, the first weld mark being spaced apart from the positioning hole 1401.

This arrangement allows the plurality of sub-tabs 112 to be welded to the adapter 14 during the welding process, increasing the number of welding operations between the tab 112 and the adapter 14, thereby enhancing the conductive strength between the adapter 14 and the tab 112. Additionally, the first weld mark is also spaced apart from the positioning hole 1401, so that welding material is not prone to flow into the positioning hole 1401 during the welding process of the sub-tabs 112 and the adapter 14, reducing interference of the welding technology of the tab 112 and the adapter 14 with the function of the positioning hole 1401 in positioning the electrode terminal 13, and facilitating assembly of the battery cell 10.

In some embodiments, referring to FIG. 3 and FIG. 6 together, and in conjunction with other drawings, a minimum spacing between the weld mark formed by welding the electrode assembly 11 to the adapter 14 and the positioning hole 1401 ranges from 0.2 mm to 6 mm.

The weld mark formed by welding the electrode assembly 11 to the adapter 14 may include the first weld mark and the second weld mark, or may include the second weld mark without including the first weld mark.

The first adapter 14a is used as an example. As shown in FIG. 6, when the plurality of first sub-tabs 112 are welded, they are further welded to the first adapter 14a to form the first weld mark, and at least a portion of the first weld mark is welded to the first adapter 14a to form the second weld mark. In this case, the weld mark formed by welding the electrode assembly 11 to the adapter 14 includes both the first weld mark and the second weld mark. The first weld mark is spaced apart from the first adapter 14a, and the second weld mark is spaced apart from the positioning hole 1401. Based on this, an orthographic projection of the first weld mark on the first adapter 14a is larger than that of the second weld mark and covers the second weld mark. The minimum spacing between the weld mark formed by welding the electrode assembly 11 to the adapter 14 and the positioning hole 1401 is a linear distance between the first weld mark and the positioning hole 1401, denoted as a first spacing H4.

In welding the plurality of first sub-tabs 112 to form the first weld mark, if they are not welded to the first adapter 14a, and after the welding, at least a portion of the first weld mark is welded to the first adapter 14a to form the second weld mark. In this case, the weld mark formed by welding the electrode assembly 11 to the adapter 14 may include the second weld mark without including the first weld mark. The second weld mark is spaced apart from the positioning hole 1401. Based on this, the minimum spacing between the weld mark formed by welding the electrode assembly 11 to the adapter 14 and the positioning hole 1401 is a linear distance between the second weld mark and the positioning hole 1401, denoted as a second spacing H5.

It can be understood that the minimum spacing between the weld mark formed by welding the electrode assembly 11 to the adapter 14 and the positioning hole 1401 may be 0.5 mm, 0.8 mm, 1 mm, 1.5 mm, 2 mm, 2.5 mm, 3 mm, 3.5 mm, 4 mm, 4.5 mm, or the like.

This configuration provides an appropriate range for the minimum spacing between the weld mark formed by welding the electrode assembly 11 to the adapter 14 and the positioning hole 1401. This can first mitigate the problem that welding material flows into the positioning hole 1401 during the welding process of the electrode assembly 11 and the adapter 14, reducing interference of the welding technology of the electrode assembly 11 and the adapter 14 with the function of the positioning hole 1401 in positioning the electrode terminal 13. Second, this allows the weld mark formed by welding the electrode assembly 11 to the adapter 14 and the positioning hole 1401 to be compactly arranged on the adapter 14, thereby reducing the size of the adapter 14.

In some embodiments, referring to FIG. 3 and FIG. 6 together, and in conjunction with other drawings, the electrode assembly 11 includes a main body portion 111 and a tab 112 disposed on the main body portion 111. The tab 112 includes a first tab 112a, the electrode terminal 13 includes a first electrode terminal 13a, the adapter 14 includes a first adapter 14a, and the insulating member 15 includes a first insulating member 15a. The first adapter 14a is conductively connected to the first tab 112a and the first electrode terminal 13a, at least a portion of the first insulating member 15a is located between the first adapter 14a and the casing 12, and at least a portion of the first insulating member 15a is spaced apart from the first adapter 14a. The first adapter 14a is conductively connected to the first tab 112a to form a plurality of spaced-apart first connection portions 1121a.

The first connection portion 1121a refers to a structure formed through conductive connection between the first adapter 14a and the first tab 112a, the first connection portion 1121a being disposed between the first adapter 14a and the first tab 112a.

It should be noted that when the first adapter 14a and the first tab 112a are conductively connected through welding, the first connection portion 1121a formed through conductive connection between the first adapter 14a and the first tab 112a refers to the second weld mark mentioned above.

Forming the plurality of spaced-apart first connection portions 1121a through conductive connection between the first tab 112a and the first adapter 14a allows the first tab 112a to be connected to multiple different positions on the first adapter 14a. This first ensures more uniform current distribution between the first adapter 14a and the first tab 112a, reducing the current flow temperature of the first adapter 14a to mitigate the problem that current concentration in the first adapter 14a causes heat concentration, thereby mitigating the problem that excessively much heat from the first adapter 14a causes insulation performance failure of the first insulating member 15a. Second, this can allow for a good current capacity between the first adapter 14a and the first tab 112a.

In some embodiments, referring to FIG. 3 and FIG. 6 together, and in conjunction with other drawings, the casing 12 is provided with an electrolyte injection hole 1201, and a plurality of first connection portions 1121a are disposed on a side of the first electrode terminal 13a farther away from the electrolyte injection hole 1201.

The electrolyte injection hole 1201 refers to a hole for allowing electrolyte to enter the internal environment of the battery cell 10.

The first connection portions 1121a are located on the side of the first electrode terminal 13a farther away from the electrolyte injection hole 1201. As an example, as shown in FIG. 6, the first connection portions 1121a are located on the side of the first electrode terminal 13a farther away from the electrolyte injection hole 1201 along the second direction X. That is, along the second direction X, the first electrode terminal 13a is located between the electrolyte injection hole 1201 and the first connection portions 1121a, and a connection line (straight line) between the electrolyte injection hole 1201 and the first connection portions 1121a may pass through the first electrode terminal 13a. In addition, the plurality of first connection portions 1121a are located on the same side of the first electrode terminal 13a farther away from the electrolyte injection hole 1201 along the second direction X, that is, a connection line (straight line) between any two adjacent first connection portions 1121a does not pass through the first electrode terminal 13a.

Positioning the first connection portions 1121a on the side of the first electrode terminal 13a farther away from the electrolyte injection hole 1201 enables the first adapter 14a to be away from the electrolyte injection hole 1201 as far as possible. This can ensure that the first adapter 14a does not interfere with the operation of the electrolyte injection hole 1201.

It should be further noted that the electrolyte injection hole 1201 is spaced apart from the first adapter 14a, allowing the first adapter 14a to be positioned away from the electrolyte injection hole 1201. This ensures that the first adapter 14a does not interfere with the operation of injecting electrolyte into the casing 12.

In some embodiments, when the area of the first adapter 14a is sufficiently large, the plurality of first connection portions 1121a may alternatively be distributed on two opposite sides of the first electrode terminal 13a. Specifically, positioning at least a portion of the first connection portion 1121a of the first electrode terminal 13a between two first connection portions 1121a. That is, a connection line (straight line) between two first connection portions 1121a may pass through the first electrode terminal 13a. This can ensure more uniform current distribution in the first adapter 14a, reducing the risk of insulation performance failure of the first insulating member 15a.

In some embodiments, referring to FIG. 3 to FIG. 6 together, and in conjunction with other drawings, a first wall 122a is provided on a side of the casing 12 along the first direction Z, and the first electrode terminal 13a and the electrolyte injection hole 1201 are spaced apart on the first wall 122a.

It can be understood that the electrolyte injection hole 1201 and the first electrode terminal 13a are disposed on the same wall of the casing 12 along the first direction Z.

As shown in FIG. 3 to FIG. 6, the electrolyte injection hole 1201 is spaced apart from the first adapter 14a along the first direction Z. Additionally, the electrolyte injection hole 1201 is spaced apart from the first adapter 14a along the second direction X, so that the electrolyte injection hole 1201 is spaced apart from the first adapter 14a.

Positioning the first electrode terminal 13a and the electrolyte injection hole 1201 on the same wall of the casing 12 along the first direction Z helps to enhance the structural compactness of the battery cell 10.

In some embodiments, referring to FIG. 3 and FIG. 6 together, and in conjunction with other drawings, the first tab 112a includes a plurality of first sub-tabs 112, the plurality of first sub-tabs 112 being connected to form a second connection portion 1122a. At least a portion of the second connection portion 1122a is conductively connected to the first adapter 14a to form the first connection portion 1121a.

The second connection portion 1122a refers to a structure formed by connecting the plurality of first sub-tabs 112, the second connection portion 1122a being disposed on the first tab 112a.

It should be noted that when the plurality of first sub-tabs 112 are connected through welding, the second connection portion 1122a formed by connecting the plurality of first sub-tabs 112 refers to the first weld mark mentioned above.

Based on the above structure, in the process of conductively connecting the first tab 112a to the first adapter 14a, the plurality of first sub-tabs 112 may first be connected to form the second connection portion 1122a, and then at least the portion of the second connection portion 1122a is conductively connected to the first adapter 14a to form a conductive connection between the first tab 112a and the first adapter 14a. This configuration can allow for desirable conductive connection between the first tab 112a and the first adapter 14a.

In some embodiments, referring to FIG. 3 and FIG. 7 together, and in conjunction with other drawings, the tab 112 further includes a second tab 112b, the electrode terminal 13 further includes a second electrode terminal 13b, the adapter 14 further includes a second adapter 14b, and the insulating member 15 further includes a second insulating member 15b. The second adapter 14b is conductively connected to the second tab 112b and the second electrode terminal 13b, at least a portion of the second insulating member 15b is located between the second adapter 14b and the casing 12, and at least a portion of the second insulating member 15b is spaced apart from the second adapter 14b.

It can be understood that the numbers of electrode terminals 13, adapters 14, and insulating members 15 each are two, the two electrode terminals 13 being a first electrode terminal 13a and a second electrode terminal 13b, the two adapters 14 being a first adapter 14a and a second adapter 14b, and the two insulating members 15 being a first insulating member 15a and a second insulating member 15b. The first adapter 14a is conductively connected to the first tab 112a, and the first adapter 14a is conductively connected to the first electrode terminal 13a. The second adapter 14b is conductively connected to the second tab 112b, and the second adapter 14b is conductively connected to the second electrode terminal 13b. At least a portion of the first insulating member 15a is located between the first adapter 14a and an inner wall of the casing 12 to implement insulation between the first adapter 14a and the casing 12. At least a portion of the second insulating member 15b is disposed between the second adapter 14b and the casing 12 to implement insulation between the casing 12 and the second adapter 14b.

This configuration ensures that the insulating member 15 can be disposed between each adapter 14 and the casing 12, thereby implementing insulation between each adapter 14 and the casing 12.

In some embodiments, referring to FIG. 3 and FIG. 7 together, and in conjunction with other drawings, the tab 112 further includes a second tab 112b, the electrode terminal 13 further includes a second electrode terminal 13b, and the adapter 14 further includes a second adapter 14b. The second adapter 14b is conductively connected to the second tab 112b and the second electrode terminal 13b. The second tab 112$b$ is conductively connected to the second adapter 14$b$ to form a plurality of spaced-apart third connection portions 1121$b$.

The third connection portion 1121$b$ refers to a structure formed through conductive connection between the second adapter 14$b$ and the second tab 112$b$, the third connection portion 1121$b$ being disposed between the second adapter 14$b$ and the second tab 112$b$.

It should be noted that when the second adapter 14$b$ and the second tab 112$b$ are conductively connected through welding, the third connection portion 1121$b$ formed by the conductive connection between the second adapter 14$b$ and the second tab 112$b$ refers to the second weld mark mentioned above.

Forming the plurality of spaced-apart third connection portions 1121$b$ through conductive connection between the second tab 112$b$ and the second adapter 14$b$ enables the second tab 112$b$ to be connected to multiple different positions on the second adapter 14$b$. This first ensures more uniform current distribution between the second adapter 14$b$ and the second tab 112$b$, reducing the current flow temperature of the second adapter 14$b$ to mitigate the problem that current concentration in the second adapter 14$b$ causes heat concentration, thereby mitigating the problem that excessively much heat from the second adapter 14$b$ causes insulation performance failure of the second insulating member 15$b$. Second, this can allow for a good current capacity between the second adapter 14$b$ and the second tab 112$b$.

In some embodiments, referring to FIG. 7, and in conjunction with other drawings, at least a portion of the second electrode terminal 13$b$ is located between two third connection portions 1121$b$.

It can be understood that a connection line (straight line) between two third connection portions 1121$b$ may pass through the second electrode terminal 13$b$.

As an example, as shown in FIG. 7, two third connection portions 1121$b$ are spaced apart along the second direction X. In addition, a portion of the second electrode terminal 13$b$ is located between the two third connection portions 1121$b$, such that one third connection portion 1121$b$, a portion of the second electrode terminal 13$b$, and the other third connection portion 1121$b$ are sequentially arranged along the second direction X, respectively positioning the two third connection portions 1121$b$ on two opposite sides of the second electrode terminal 13$b$ along the second direction X. Certainly, in other examples, the two third connection portions 1121$b$ may alternatively be spaced apart along a direction intersecting both the first direction Z and the second direction X, with at least a portion of the second electrode terminal 13$b$ located between the two third connection portions 1121$b$.

This configuration disperses positions of the second adapter 14$b$ for connection to the second tab 112$b$, ensuring more uniform current distribution within the battery cell 10, thereby reducing the current flow temperature of the second adapter 14$b$, and lowering the risk of insulation performance failure of the second insulating member 15$b$ caused by the second adapter 14$b$.

In some embodiments, referring to FIG. 7, and in conjunction with other drawings, the second tab 112$b$ includes a plurality of second sub-tabs 112, the plurality of second sub-tabs 112 being connected to form a fourth connection portion 1122$b$, and at least a portion of the fourth connection portion 1122$b$ being conductively connected to the second adapter 14$b$ to form the third connection portion 1121$b$.

The fourth connection portion 1122$b$ refers to a structure formed by connecting the plurality of second sub-tabs 112, the fourth connection portion 1122$b$ being disposed on the second tab 112$b$.

It should be noted that when the plurality of second sub-tabs 112 are connected through welding, the fourth connection portion 1122$b$ formed by connecting the plurality of second sub-tabs 112 refers to the first weld mark mentioned above.

Based on the above structure, in the process of conductively connecting the second tab 112$b$ to the second adapter 14$b$, the plurality of second sub-tabs 112 may first be connected to form the fourth connection portion 1122$b$, and then at least a portion of the fourth connection portion 1122$b$ is conductively connected to the second adapter 14$b$ to form a conductive connection between the second tab 112$b$ and the second adapter 14$b$. This configuration can allow for desirable conductive connection between the second tab 112$b$ and the second adapter 14$b$.

In some embodiments, referring to FIG. 7, and in conjunction with other drawings, the plurality of second sub-tabs 112 are connected to form a plurality of spaced-apart fourth connection portions 1122$b$. At least a portion of each fourth connection portion 1122$b$ is conductively connected to the second adapter 14$b$ to form a corresponding third connection portion 1121$b$.

With the plurality of spaced-apart fourth connection portions 1122$b$ formed by connecting the second sub-tabs 112 so that each fourth connection portion 1122$b$ is conductively connected to the second adapter 14$b$ to form the corresponding third connection portion 1121$b$, current distribution between the second adapter 14$b$ and the second tab 112$b$ can be more uniform, thereby reducing the current flow temperature of the second adapter 14$b$ and lowering the risk of insulation performance failure of the second insulating member 15$b$ caused by the second adapter 14$b$.

Based on the above idea, referring to FIG. 2, the embodiments of this application further provide a battery 100, the battery 100 including a battery cell 10. The battery cell 10 in this embodiment is the same as the battery cell 10 in the previous embodiments. For details, refer to the relevant description of the battery cell 10 in the previous embodiments, which are not repeated herein.

According to the battery 100 provided by the embodiments of this application, the foregoing battery cell 10 is used, and at least a portion of an insulating member 15 is spaced apart from an adapter 14, so that heat conduction between the adapter 14 and the insulating member 15 can be reduced, thereby mitigating the problem that heat from the adapter 14 being conducted to the insulating member 15 causes failure of insulation performance of the insulating member 15. Therefore, this enables the insulating member 15 to achieve good insulation effects between the adapter 14 and the casing 12, thereby enhancing the reliability of the battery 100.

Based on the above idea, referring to FIG. 1, the embodiments of this application further provide an electric device. The electric device includes a battery cell 10 or a battery 100. The battery cell 10 and battery 100 in this embodiment are the same as the battery cell 10 and battery 100 in the previous embodiments. For details, refer to the relevant description of the battery cell 10 and battery 100 in the previous embodiments, which is not repeated herein.

According to the electric device provided by the embodiments of this application, the foregoing battery cell 10 or battery 100 is used, and at least a portion of an insulating member 15 is spaced apart from an adapter 14, so that heat conduction between the adapter 14 and the insulating member 15 can be reduced, thereby mitigating the problem that heat from the adapter 14 being conducted to the insulating member 15 causes failure of insulation performance of the insulating member 15. Therefore, this enables the insulating member 15 to achieve good insulation effects between the adapter 14 and the casing 12, thereby enhancing the reliability of the battery cell 10 or battery 100.

As one embodiment of this application, as shown in FIG. 3 to FIG. 7, the battery cell 10 includes a casing 12, an electrode assembly 11, a first electrode terminal 13a, a second electrode terminal 13b, a first adapter 14a, a second adapter 14b, a first insulating member 15a, and a second insulating member 15b. The electrode assembly 11, the first adapter 14a, the second adapter 14b, the first insulating member 15a, and the second insulating member 15b are all disposed within the casing 12. The electrode assembly 11 includes a main body portion 111, a first tab 112a, and a second tab 112b, the first tab 112a and the second tab 112b being disposed at two opposite ends of the main body portion 111 along a first direction Z. Two opposite walls of the casing 12 along the first direction Z are a first wall 122a and a second wall 122b, respectively, the first electrode terminal 13a being disposed on the first wall 122a, and the second electrode terminal 13b being disposed on the second wall 122b. Along the first direction Z, the first adapter 14a is disposed on the first tab 112a, and at least a portion of the first insulating member 15a is located between the first adapter 14a and the first wall 122a. Along the first direction Z, the second adapter 14b is disposed on the second tab 112b, and at least a portion of the second insulating member 15b is located between the second adapter 14b and the second wall 122b. The first adapter 14a is welded to the first tab 112a, and the first adapter 14a is welded to the first electrode terminal 13a. The second adapter 14b is welded to the second tab 112b, and the second adapter 14b is welded to the second electrode terminal 13b. Furthermore, at least a portion of the first insulating member 15a is spaced apart from the first adapter 14a, and at least a portion of the second insulating member 15b is spaced apart from the second adapter 14b.

The first adapter 14a is provided with a positioning hole 1401, and the first electrode terminal 13a is inserted into the positioning hole 1401 along the first direction Z. A weld mark formed by welding the first tab 112a to the first adapter 14a is spaced apart from the positioning hole 1401.

The first wall 122a is provided with an electrolyte injection hole 1201, and a weld mark formed by welding the first adapter 14a to the first tab 112a is located on a side of the first electrode terminal 13a farther away from the electrolyte injection hole 1201.

Weld marks formed by welding the second adapter 14b to the second tab 112b are respectively disposed on two opposite sides of the second electrode terminal 13b. Specifically, at least a portion of the second electrode terminal 13b is located between two of the weld marks formed by welding the second adapter 14b to the second tab 112b.

The above are merely preferred embodiments of this application and are not intended to limit this application. Any modifications, equivalent substitutions, improvements, and the like made within the spirit and principles of this application should be included within the protection scope of this application.

What is claimed is:

1. A battery cell, comprising: a casing; an electrode assembly disposed within the casing; an electrode terminal; an adapter disposed within the casing and conductively connected to the electrode assembly and the electrode terminal; and an insulating member disposed within the casing and at least partially located between the adapter and the casing, wherein at least a portion of the insulating member is spaced apart from the adapter; wherein a wall of the casing along the first direction is provided with an electrolyte injection hole and the insulating member further comprises a protruding post, the protruding post being disposed on a side of the body portion facing towards the electrode assembly along the first direction, where the electrolyte injection hole penetrates the body portion and the protruding post and is in communication with an interior of the casing, and the adapter is spaced apart from the protruding post along a second direction, the second direction intersecting the first direction, wherein a gap formed by spacing between at least a portion of the insulating member and the adapter is greater than 0.1 mm; and/or the gap formed by the spacing between at least the portion of the insulating member and the adapter is less than 2 mm.

2. The battery cell according to claim 1, wherein the adapter is disposed at an end of the electrode assembly along a first direction, the insulating member comprises a body portion, and along the first direction, the body portion is located between the adapter and the casing and is spaced apart from the adapter along the first direction.

3. The battery cell according to claim 2, wherein the insulating member further comprises a first boss, the first boss being disposed on a side of the body portion facing towards the electrode assembly along the first direction; and the adapter is spaced apart from the first boss along a second direction, the second direction intersecting the first direction.

4. The battery cell according to claim 1, wherein the electrode assembly is welded to the adapter.

5. The battery cell according to claim 4, wherein a weld mark formed by welding the electrode assembly to the adapter is spaced apart from the insulating member.

6. The battery cell according to claim 1, wherein the adapter is provided with a positioning hole, and the electrode terminal is inserted into the positioning hole and/or the electrode assembly is welded to the adapter, and a weld mark formed by welding the electrode assembly to the adapter is spaced apart from the positioning hole.

7. The battery cell according to claim 6, wherein the electrode assembly comprises a main body portion and a tab disposed on the main body portion, the tab comprises a plurality of sub-tabs, the plurality of sub-tabs are welded to form a first weld mark, at least a portion of the first weld mark is welded to the adapter to form a second weld mark, and the second weld mark is spaced apart from the positioning hole.

8. The battery cell according to claim 7, wherein the plurality of sub-tabs are welded and welded to the adapter to form the first weld mark, the first weld mark being spaced apart from the positioning hole.

9. The battery cell according to claim 6, wherein a minimum spacing between the weld mark formed by welding the electrode assembly to the adapter and the positioning hole ranges from 0.2 mm to 6 mm.

10. The battery cell according to claim 1, wherein the electrode assembly comprises a main body portion and a tab disposed on the main body portion, the tab comprises a first tab, the electrode terminal comprises a first electrode terminal, the adapter comprises a first adapter, the insulating member comprises a first insulating member, the first adapter is conductively connected to the first tab and the first electrode terminal, at least a portion of the first insulating member is located between the first adapter and the casing, and at least a portion of the first insulating member is spaced apart from the first adapter;

wherein the first adapter is conductively connected to the first tab to form a plurality of spaced-apart first connection portions.

11. The battery cell according to claim 10, wherein the casing is provided with an electrolyte injection hole, and the plurality of first connection portions are disposed on a side of the first electrode terminal farther away from the electrolyte injection hole.

12. The battery cell according to claim 11, wherein a first wall is provided on a side of the casing along a first direction, and the first electrode terminal and the electrolyte injection hole are spaced apart on the first wall.

13. The battery cell according to claim 10, wherein the first tab comprises a plurality of first sub-tabs, the plurality of first sub-tabs being connected to form a second connection portion, and at least a portion of the second connection portion being conductively connected to the first adapter to form the first connection portion.

14. The battery cell according to claim 10, wherein the tab further comprises a second tab, the electrode terminal further comprises a second electrode terminal, the adapter further comprises a second adapter, the insulating member further comprises a second insulating member, the second adapter is conductively connected to the second tab and the second electrode terminal, at least a portion of the second insulating member is located between the second adapter and the casing, and at least a portion of the second insulating member is spaced apart from the second adapter.

15. The battery cell according to claim 10, wherein the tab further comprises a second tab, the electrode terminal further comprises a second electrode terminal, and the adapter further comprises a second adapter, the second adapter is conductively connected to the second tab and the second electrode terminal, and the second tab is conductively connected to the second adapter to form a plurality of spaced-apart third connection portions.

16. The battery cell according to claim 15, wherein at least a portion of the second electrode terminal is located between two of the third connection portions.

17. The battery cell according to claim 15, wherein the second tab comprises a plurality of second sub-tabs, the plurality of second sub-tabs being connected to form a fourth connection portion, and at least a portion of the fourth connection portion being conductively connected to the second adapter to form the third connection portion and/or the plurality of second sub-tabs are connected to form a plurality of spaced-apart fourth connection portions, at least a portion of each fourth connection portion being conductively connected to the second adapter to form a corresponding third connection portion.

18. A battery, comprising the battery cell according to claim 1.

* * * * *